(12) United States Patent
Tian et al.

(10) Patent No.: US 11,944,954 B2
(45) Date of Patent: Apr. 2, 2024

(54) ORGANIC-INORGANIC HYBRID POROUS MATERIAL AND PREPARATION METHOD THEREOF, SEPARATOR, ELECTROCHEMICAL DEVICE, AND ELECTRICAL DEVICE

(71) Applicant: Contemporary Amperex Technology Co., Limited, Ningde (CN)

(72) Inventors: Jiarui Tian, Ningde (CN); Yongsheng Guo, Ningde (CN); Cong Cheng, Ningde (CN); Xinxin Zhang, Ningde (CN); Na Liu, Ningde (CN); Chuying Ouyang, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 17/937,457

(22) Filed: Oct. 2, 2022

(65) Prior Publication Data
US 2023/0285933 A1    Sep. 14, 2023

Related U.S. Application Data

(63) Continuation of application No. PCT/CN2021/114463, filed on Aug. 25, 2021.

(51) Int. Cl.
*B01J 20/22* (2006.01)
*B01J 20/28* (2006.01)
(Continued)

(52) U.S. Cl.
CPC ....... *B01J 20/226* (2013.01); *B01J 20/28059* (2013.01); *B01J 20/28061* (2013.01);
(Continued)

(58) Field of Classification Search
None
See application file for complete search history.

(56) References Cited

U.S. PATENT DOCUMENTS 10,246,367 B2 * 4/2019 Grandjean ............... C03C 3/06
10,940,469 B2   3/2021 Zhao et al.
(Continued)

FOREIGN PATENT DOCUMENTS

CN   105833852 A   8/2016
CN   108421280 A   8/2018
(Continued)

OTHER PUBLICATIONS

International Search Report received in PCT Application PCT/CN2021/114463 dated May 20, 2022.
(Continued)

*Primary Examiner* — Colin W. Slifka
*Assistant Examiner* — Michael Forrest
(74) *Attorney, Agent, or Firm* — Kilpatrick Townsend & Stockton LLP

(57) ABSTRACT

An organic-inorganic hybrid porous material. The organic-inorganic hybrid porous material contains a doping element A are provided. In some embodiments, the element A is one or more selected from: Li, Na, K, Rb, Cs, Sr, Zn, Mg, Ca, or any combination thereof. An external specific surface area of the organic-inorganic hybrid porous material is 1 to 100 $m^2/g$. A ratio of the external specific surface area to a total specific surface area of the organic-inorganic hybrid porous material is 0.7 to 0.9.

18 Claims, 4 Drawing Sheets

(51) Int. Cl.
*H01M 50/417* (2021.01)
*H01M 50/446* (2021.01)
*H01M 50/449* (2021.01)

(52) U.S. Cl.
CPC ..... *B01J 20/2808* (2013.01); *B01J 20/28083* (2013.01); *B01J 20/28085* (2013.01); *H01M 50/417* (2021.01); *H01M 50/446* (2021.01); *H01M 50/449* (2021.01)

(56) References Cited

U.S. PATENT DOCUMENTS

| | | | |
|---|---|---|---|
| 11,198,614 B2 | 12/2021 | Friebel et al. | |
| 2020/0071175 A1 | 3/2020 | Friebel et al. | |
| 2020/0129971 A1 | 4/2020 | Zhao et al. | |

FOREIGN PATENT DOCUMENTS

| | | | |
|---|---|---|---|
| CN | 109216712 A | 1/2019 | |
| CN | 110416475 A | 11/2019 | |
| CN | 112850749 A | 5/2021 | |
| CN | 113206224 A | 8/2021 | |

OTHER PUBLICATIONS

Written Opinion received in PCT Application PCT/CN2021/114463 dated May 20, 2022.

Huang Bin et al:"Prussian Blue K2FeFe(CN)6 Doped with Nickel as a Superior Cathode: An Efficient Strategy to Enhance Potassium Storage Performance" ACS Sustainable Chemistry & Engineering, vol. 7, No. 19, Oct. 7, 2019 (Oct. 7, 2019), pp. 16659-16667.

Li Yiwei et al:"Synthetic control of Prussian blue derived nanomaterials for energy storage and conversion application" Materials Today Energy, vol. 14, Dec. 1, 2019 (Dec. 1, 2019), p. 100332.

Long Wang et al:"Rhombohedral Prussian White as Cathode for Rechargeable Sodium-Ion Batteries" Journal of the American Chemical Society, vol. 137, No. 7, Feb. 10, 2015 (Feb. 10, 2015), pp. 2548-2554.

Kjeldgaard Solveig et al:"Strategies for synthesis of Prussian blue analogues" Royal Society Open Science, vol. 8, No. 1, Jan. 27, 2021 (Jan. 27, 2021), p. 201779.

The extended European search report received in the corresponding European application 21931929.0, dated May 26, 2023.

* cited by examiner

ORGANIC-INORGANIC HYBRID POROUS MATERIAL AND PREPARATION METHOD THEREOF, SEPARATOR, ELECTROCHEMICAL DEVICE, AND ELECTRICAL DEVICE

TECHNICAL FIELD

This disclosure relates to the technical field of lithium batteries, and in particular, to an organic-inorganic hybrid porous material and a preparation method thereof, a separator, an electrochemical device, and an electrical device.

BACKGROUND

In recent years, the disclosure scope of lithium-ion batteries has been expanded. The lithium-ion batteries are widely used in energy storage power systems such as hydro, thermal, wind, and solar power stations, and many other fields such as electric tools, electric bicycles, electric motorcycles, and electric vehicles, military equipment, and aerospace. The great development of the lithium-ion batteries gives rise to higher requirements on the cycle performance and rate performance of the batteries.

In the related art, a microporous polyolefin film such as polyethylene (PE) and polypropylene (PP) film is used as a separator. Although such separators are cost-efficient, a limited ionic conductivity of the separators has bottlenecked the cycle performance and rate performance of the lithium-ion batteries. Therefore, the ionic conductivity of existing separators still needs to be improved.

SUMMARY

This disclosure is filed in view of the foregoing problems, and aims to provide a novel organic-inorganic hybrid porous material. The novel organic-inorganic hybrid porous material is configured to modify a separator and can improve an ionic conductivity of the separator. When the modified separator is applied to an electrochemical device such as a battery, the battery exhibits improved cycle performance and rate performance.

To achieve the foregoing objective, this disclosure discloses an organic-inorganic hybrid porous material. The organic-inorganic hybrid porous material contains a doping element A. The element A is one or more selected from: Li, Na, K, Rb, Cs, Sr, Zn, Mg, Ca, or any combination thereof An external specific surface area of the organic-inorganic hybrid porous material is 1 to 100 $m^2/g$. A ratio of the external specific surface area to a total specific surface area of the organic-inorganic hybrid porous material is 0.7 to 0.9.

Therefore, this disclosure uses the novel organic-inorganic hybrid porous material to modify a battery separator, so that the battery separator exhibits an improved ionic conductivity unexpectedly. A battery containing the separator exhibits improved cycle performance and rate performance unexpectedly.

In any embodiment, the total specific surface area of the organic-inorganic hybrid porous material is 1.15 to 140 $m^2/g$. Optionally, the total specific surface area is 5 to 110 $m^2/g$. Further optionally, the total specific surface area is 10 to 80 $m^2/g$. When a battery separator is modified by the novel organic-inorganic hybrid porous material based on the foregoing technical solution, the battery separator exhibits an improved ionic conductivity unexpectedly. A battery containing the separator exhibits improved cycle performance and rate performance unexpectedly.

In any embodiment, a volume median diameter $D_{v50}$ of the organic-inorganic hybrid porous material is 0.1 to 2 μm. Optionally, the volume median diameter is 0.3 to 1.5 μm. Further optionally, the volume median diameter is 0.5 to 1.0 μm. When a battery separator is modified by the novel organic-inorganic hybrid porous material based on the foregoing technical solution, the battery separator exhibits an improved ionic conductivity unexpectedly. A battery containing the separator exhibits improved cycle performance and rate performance unexpectedly.

In any embodiment, an average pore diameter of the organic-inorganic hybrid porous material is 0.1 to 10 nm. Optionally, the average pore diameter is 0.5 to 8.9 nm. Further optionally, the average pore diameter is 0.8 to 6.5 nm. When a battery separator is modified by the novel organic-inorganic hybrid porous material based on the foregoing technical solution, the battery separator exhibits an improved ionic conductivity unexpectedly. A battery containing the separator exhibits improved cycle performance and rate performance unexpectedly.

In any embodiment, at least a part of atoms or cations of the element A are distributed in pores of the organic-inorganic hybrid porous material. When a battery separator is modified by the novel organic-inorganic hybrid porous material based on the foregoing technical solution, the battery separator exhibits an improved ionic conductivity unexpectedly. A battery containing the separator exhibits improved cycle performance and rate performance unexpectedly.

In any embodiment, the organic-inorganic hybrid porous material is a metal-organic framework material. When a battery separator is modified by the novel organic-inorganic hybrid porous material based on the foregoing technical solution, the battery separator exhibits an improved ionic conductivity unexpectedly. A battery containing the separator exhibits improved cycle performance and rate performance unexpectedly.

In any embodiment, at least a part of atoms or cations of the element A are distributed in pores of the metal-organic framework material. When a battery separator is modified by the novel organic-inorganic hybrid porous material based on the foregoing technical solution, the battery separator exhibits an improved ionic conductivity unexpectedly. A battery containing the separator exhibits improved cycle performance and rate performance unexpectedly.

In any embodiment, the element A is one or more selected from: Li, Na, or K. Optionally, the element A is Li. When a battery separator is modified by the novel organic-inorganic hybrid porous material based on the foregoing technical solution, the battery separator exhibits an improved ionic conductivity unexpectedly. A battery containing the separator exhibits improved cycle performance and rate performance unexpectedly.

In any embodiment, a weight percent of the element A in the organic-inorganic hybrid porous material is 0.001% to 10%. When a battery separator is modified by the novel organic-inorganic hybrid porous material based on the foregoing technical solution, the battery separator exhibits an improved ionic conductivity unexpectedly. A battery containing the separator exhibits improved cycle performance and rate performance unexpectedly.

In any embodiment, the organic-inorganic hybrid porous material includes: a plurality of metal cations and/or a plurality of metal cluster cations; a plurality of bridging ligands, where the bridging ligands are linked to the metal cations and/or metal cluster cations by a coordination bond, so as to form a porously structured framework. When a battery separator is modified by the novel organic-inorganic hybrid porous material based on the foregoing technical solution, the battery separator exhibits an improved ionic conductivity unexpectedly. A battery containing the separator exhibits improved cycle performance and rate performance unexpectedly.

In any embodiment, the organic-inorganic hybrid porous material possesses one of the following first to third structures: (i) a first structure: in the first structure, a bridging ligand is CN or SCN, a metal cation is a cation of one or more elements selected from: Zn, Co, Cu, Fe, Cd, Mn, Ag, Rh, Ru, Sc, Cr, Ni, Y, Ti, Zr, Hf, Sr, Pb, lanthanide, or any combination thereof, and the metal cation combines with the bridging ligand to form a cubic ordered assembled structure; (ii) a second structure: in the second structure, the bridging ligand is a polycarboxylic acid, the metal cation is a cation of one or more elements selected from: Zn, Co, Cu, Fe, Cd, Mn, Ag, Rh, Ru, Sc, Cr, Ni, Y, Ti, Zr, Hf, Sr, Pb, lanthanide, or any combination thereof, each metal cation is linked to four oxygen atoms on two carboxyl groups in two polycarboxylic acids by a coordination bond to form a metal-oxygen tetrahedral cluster, and the tetrahedral cluster combines with a remainder of the bridging ligand to form a cubic ordered assembled structure; and (iii) a third structure: in the third structure, the bridging ligand is optionally substituted imidazole, the metal cation is a cation of one or more elements selected from: Zn, Co, Cu, Fe, Cd, Mn, Ag, Rh, Ru, Sc, Cr, Ni, Y, Ti, Zr, Hf, Sr, Pb, lanthanide, or any combination thereof, and the metal cation combines with the bridging ligand to form a porous structure. When a battery separator is modified by the novel organic-inorganic hybrid porous material based on the foregoing technical solution, the battery separator exhibits an improved ionic conductivity unexpectedly. A battery containing the separator exhibits improved cycle performance and rate performance unexpectedly.

In any embodiment, the organic-inorganic hybrid porous material is expressed as a general Formula I:

$$L_x(M_aC_b)_yA_z \quad \text{Formula I}$$

In the general formula above, M is selected from one or more first-transition-series metal elements; a is a numerical value ranging from 0.1 to 10, x is a numerical value ranging from 0.5 to 50, y is a numerical value ranging from 0.5 to 50.

C is one or more selected from: O, CO, $O^{2-}$, $S^{2-}$, $C^-$, $Br^-$, $I^-$, $OH^-$, $H_2O$, —OH, =O, or any combination thereof, and b is a numerical value ranging from 0 to 20.

L is a bridging ligand capable of combining with a metal M or a metal cluster $M_aC_b$ to form a coordination bond.

A is one or more metal elements selected from: Li, Na, K, Rb, Cs, Sr, Zn, Mg, Ca, or any combination thereof; and, $0 < z \leq 100$. When a battery separator is modified by the novel organic-inorganic hybrid porous material based on the foregoing technical solution, the battery separator exhibits an improved ionic conductivity unexpectedly. A battery containing the separator exhibits improved cycle performance and rate performance unexpectedly.

In any embodiment, the organic-inorganic hybrid porous material is periodically assembled from a basic unit represented by Formula I along at least one spatial direction.

Optionally, the organic-inorganic hybrid porous material is periodically assembled from the basic unit represented by Formula I along an extension direction that is at least one of three spatial directions X', Y', and Z'. The periodically assembled quantity is an integer ranging from 3 to 10000. The three directions X', Y', and Z' are at an angle of 0 degree to 75 degrees to an X direction, a Y direction, and a Z direction of a Cartesian coordinate system respectively, and optionally, at an angle of 5 degrees to 60 degrees. When a battery separator is modified by the novel organic-inorganic hybrid porous material based on the foregoing technical solution, the battery separator exhibits an improved ionic conductivity unexpectedly. A battery containing the separator exhibits improved cycle performance and rate performance unexpectedly.

In any embodiment, L is one or more selected from: cyano, imidazole, porphyrin, pyridine, pyrazole, pyrimidine, piperidine, pyrrolidine, furan, thiophene, piperazine, pyridazine, indole, quinoline, carbazole, morpholine, carbazole, polycarboxylic acid, or a dimer or trimer of the foregoing ligands, or a multimer thereof. One or more hydrogen atoms in the bridging ligand are optionally substituted by one or more substituents selected from: cyano, nitro, amino, aldehyde, carboxyl, halogen, $C_1$ to $C_8$ alkyl, $C_1$ to $C_8$ hydroxyalkyl, $C_1$ to $C_8$ alkoxyl, $C_2$ to $C_8$ alkenyl, $C_2$ to $C_8$ alkynyl, $C_3$ to $C_{16}$ cycloalkyl, $C_6$ to $C_{20}$ aryl, $C_6$ to $C_{20}$ heteroaryl, or any combination thereof; and x is a numerical value ranging from 0.5 to 50. When a battery separator is modified by the novel organic-inorganic hybrid porous material based on the foregoing technical solution, the battery separator exhibits an improved ionic conductivity unexpectedly. A battery containing the separator exhibits improved cycle performance and rate performance unexpectedly.

In any embodiment, in Formula I, $0.5 \leq x:y \leq 6$. When a battery separator is modified by the novel organic-inorganic hybrid porous material based on the foregoing technical solution, the battery separator exhibits an improved ionic conductivity unexpectedly. A battery containing the separator exhibits improved cycle performance and rate performance unexpectedly.

In any embodiment, in Formula I, $b > 0$, and $0.5 \leq a:b \leq 8$. When a battery separator is modified by the novel organic-inorganic hybrid porous material based on the foregoing technical solution, the battery separator exhibits an improved ionic conductivity unexpectedly. A battery containing the separator exhibits improved cycle performance and rate performance unexpectedly.

In any embodiment, in Formula I, $$1 \leq \frac{x}{ay} \leq 4.3,$$

and optionally, $$1.6 \leq \frac{x}{ay}\frac{x}{a \times x} \leq 3.$$

When a battery separator is modified by the novel organic-inorganic hybrid porous material based on the foregoing technical solution, the battery separator exhibits an improved ionic conductivity unexpectedly. A battery containing the separator exhibits improved cycle performance and rate performance unexpectedly.

In any embodiment, in formula I, when M is a combination of cations of at least two metal elements, a product of a and y represents a quantity of all metal cations in a single basic unit represented by Formula I. When a battery separator is modified by the novel organic-inorganic hybrid porous material based on the foregoing technical solution, the battery separator exhibits an improved ionic conductivity unexpectedly. A battery containing the separator exhibits improved cycle performance and rate performance unexpectedly.

In any embodiment, L includes a cyano ligand, that is, a —CN ligand, M includes a Fe cation and/or a Ni cation, and A includes one or more elements selected from K, Na, or Li. When a battery separator is modified by the novel organic-inorganic hybrid porous material based on the foregoing technical solution, the battery separator exhibits an improved ionic conductivity unexpectedly. A battery containing the separator exhibits improved cycle performance and rate performance unexpectedly.

In any embodiment, L includes a benzenetricarboxylic acid ligand, that is, a BTC ligand, M includes a Fe cation, and A includes one or more elements selected from K, Na, or Li. When a battery separator is modified by the novel organic-inorganic hybrid porous material based on the foregoing technical solution, the battery separator exhibits an improved ionic conductivity unexpectedly. A battery containing the separator exhibits improved cycle performance and rate performance unexpectedly.

In any embodiment, L includes a citric acid ligand, that is, a CIT ligand, M includes a Cu cation, and A includes one or more elements selected from K, Na, or Li. When a battery separator is modified by the novel organic-inorganic hybrid porous material based on the foregoing technical solution, the battery separator exhibits an improved ionic conductivity unexpectedly. A battery containing the separator exhibits improved cycle performance and rate performance unexpectedly.

In any embodiment, L includes a tricarboxytriphenyl amine (tricarboxytriphenyl amine) ligand, that is, a TCA ligand, M includes a Cu cation, and A includes one or more elements selected from K, Na, or Li; When a battery separator is modified by the novel organic-inorganic hybrid porous material based on the foregoing technical solution, the battery separator exhibits an improved ionic conductivity unexpectedly. A battery containing the separator exhibits improved cycle performance and rate performance unexpectedly.

In any embodiment, L includes an anthraquinone-2,3-dicarboxylic acid ligand, that is, an AQDC ligand, M includes a Cu cation, and A includes one or more elements selected from K, Na, or Li. When a battery separator is modified by the novel organic-inorganic hybrid porous material based on the foregoing technical solution, the battery separator exhibits an improved ionic conductivity unexpectedly. A battery containing the separator exhibits improved cycle performance and rate performance unexpectedly.

In any embodiment, L includes an imidazole and/or 2-aminobenzimidazole ligand, that is, an Im and/or abIm ligand, M includes a Co cation, and A includes one or more elements selected from K, Na, or Li. When a battery separator is modified by the novel organic-inorganic hybrid porous material based on the foregoing technical solution, the battery separator exhibits an improved ionic conductivity unexpectedly. A battery containing the separator exhibits improved cycle performance and rate performance unexpectedly.

In any embodiment, L includes a terephthalic acid ligand, that is, a BDC ligand, F includes a Fe cation, C includes OH— and F—, and A includes one or more elements selected from K, Na, or Li. When a battery separator is modified by the novel organic-inorganic hybrid porous material based on the foregoing technical solution, the battery separator exhibits an improved ionic conductivity unexpectedly. A battery containing the separator exhibits improved cycle performance and rate performance unexpectedly.

A second aspect of this disclosure further provides a composition. The composition includes organic-inorganic hybrid porous material particles and inorganic compound particles. The organic-inorganic hybrid porous material particles are particles of any one of the organic-inorganic hybrid porous materials described above. The inorganic compound is one or more selected from: zeolite, molecular sieve, aluminum oxide, aluminum oxyhydroxide, silicon dioxide, aluminum nitride, silicon carbide, magnesium oxide, calcium oxide, zinc oxide, zirconium oxide, titanium dioxide, or any combination thereof. Based on the foregoing technical solution, the organic-inorganic hybrid porous material particles work together with the inorganic compound particles to improve the rate performance and cycle performance of the battery.

In any embodiment, a weight ratio between the organic-inorganic hybrid porous material particles and the inorganic compound particles ranges from 1:5 to 5:1. Based on the foregoing technical solution, the organic-inorganic hybrid porous material particles work together with the inorganic compound particles to improve the rate performance and cycle performance of the battery.

In any embodiment, in the composition, a weight percent of the organic-inorganic hybrid porous material particles is 20 wt % to 80 wt %, for example, 60 wt % to 80 wt %. Based on the foregoing technical solution, the organic-inorganic hybrid porous material particles work together with the inorganic compound particles to improve the rate performance and cycle performance of the battery.

In any embodiment, the composition further includes one or more ingredients selected from: a binder, a stabilizer, a wetting agent, a rheology modifier, a defoamer, a thickener, a pH adjuster, or an anti-corrosive agent. The foregoing technical solution improves overall performance of the composition.

A third aspect of this disclosure further provides an electrochemical device separator, including the material described in any embodiment above or the composition described in any embodiment above.

In any embodiment, the electrochemical device separator includes:
a base layer; and
an overlayer, where the overlayer overlays at least a part of a surface of the base layer, and the overlayer contains the material described in any embodiment above or the composition described in any embodiment above.

In any embodiment, the base layer is a porous polymer layer.

In any embodiment, the base layer is made of a material that is one or more selected from: polyethylene, polypropylene, polyester, polyacetal, polyamide, polycarbonate, polyimide, polyether ether ketone, polyether sulfone, polyphenylene oxide, polyphenylene sulfide, polyethylene naphthalate, any polyblend thereof, or any combination thereof.

In any embodiment, a volume median diameter $D_{v50}$ of the organic-inorganic hybrid porous material particles is greater than an average pore diameter of the base layer. That the particle diameter of the organic-inorganic hybrid porous material particles is greater than a pore diameter of a bare film prevents connection between a positive coating layer and a negative coating layer, and provides an appropriate transport network for free and bulk-active ions, thereby improving the transport rate of active ions, increasing the ionic conductivity, and in turn, improving the rate performance and cycle performance.

In an embodiment of this disclosure, this disclosure discloses the use of the material disclosed above or the composition disclosed above for improving the performance of an electrochemical device separator.

In an embodiment of this disclosure, this disclosure discloses an electrochemical device. The electrochemical device includes the separator described in any embodiment above.

In an embodiment of this disclosure, the electrochemical device is a battery. The battery includes a positive electrode, a negative electrode, and the electrochemical device separator described in any embodiment above. The separator is located between the positive electrode and the negative electrode.

In an embodiment of this disclosure, the battery further includes an electrolytic solution. The positive electrode, the negative electrode, and the separator are all in contact with the electrolytic solution.

In an embodiment of this disclosure, the positive electrode contains a positive active material. The positive active material is one or more selected from: lithium cobalt oxide, lithium nickel oxide, lithium manganese oxide, lithium nickel cobalt manganese oxide, lithium nickel cobalt aluminum oxide, lithium iron phosphate, lithium manganese iron phosphate, lithium cobalt phosphate, sulfur simple substance, or any combination thereof.

In an embodiment of this disclosure, the negative electrode is made of a material that is one or more selected from: graphite, soft carbon, hard carbon, lithium-titanium composite oxide, metal M simple substance, alloy, oxide, carbide, or any combination thereof, where the metal M is selected from Li, Si, Sn, Zn, Mg, Cd, Ce, Ni, or Fe.

In an embodiment of this disclosure, the electrolytic solution contains a lithium salt. The lithium salt is one or more selected from: LiCl, LiBr, LiI, LiClO$_4$, LiBF$_4$, LiB$_{10}$Cl$_{10}$, LiPF$_6$, LiAsF$_6$, LiSbF$_6$, LiAlCl$_4$, LiSCN, Li(FSO$_2$)$_2$N, LiCF$_3$CO$_2$, LiCH$_3$SO$_3$, LiCF$_3$SO$_3$, LiN(SO$_2$CF$_3$)$_2$, LiN(SO$_2$C$_2$F$_5$)$_2$, LiC$_4$F$_9$SO$_3$, LiC(CF$_3$SO$_2$)$_3$, (CF$_3$SO$_2$)$_2$NLi, LiOH, LiB(C$_2$O$_4$)$_2$, lithium chloroborane, lithium lower aliphatic carboxylate, lithium tetraphenylborate, lithium imide, or any combination thereof.

In an embodiment of this disclosure, the electrochemical device is a lithium-ion battery, a sodium-ion battery, a potassium-ion battery, a zinc-ion battery, a lithium-sulfur battery, or a lithium-ion supercapacitor.

A fourth aspect of this disclosure further provides an electrical device. The electrical device includes the electrochemical device described in any embodiment above.

A fifth aspect of this disclosure further provides a method for manufacturing an electrochemical device separator, including:
providing a base layer; and
overlaying at least a part of a surface of the base layer with an overlayer, where the overlayer contains the material described in any embodiment above or the composition described in any embodiment above.

Optionally, the base layer is a porous polymer layer.

Optionally, the base layer is made of a material that is one or more selected from: polyethylene, polypropylene, polyester, polyacetal, polyamide, polycarbonate, polyimide, polyether ether ketone, polyether sulfone, polyphenylene oxide, polyphenylene sulfide, polyethylene naphthalate, any polyblend thereof, or any combination thereof.

In an embodiment of this disclosure, the step of overlaying at least a part of a surface of the base layer with an overlayer includes the following operations:
providing a coating material, where the coating material contains the material described in any embodiment above or the composition described in any embodiment above; and overlaying at least a part of the surface of the base layer with the coating material.

This disclosure achieves at least the following beneficial effects:

This disclosure discloses an organic-inorganic hybrid porous material. The organic-inorganic hybrid porous material contains a doping element A. The element A is one or more selected from: Li, Na, K, Rb, Cs, Sr, Zn, Mg, Ca, or any combination thereof An external specific surface area of the organic-inorganic hybrid porous material is 1 to 100 m$^2$/g. In addition, a ratio of the external specific surface area to a total specific surface area of the organic-inorganic hybrid porous material is 0.7 to 0.9. This disclosure uses the foregoing novel organic-inorganic hybrid porous material to modify a battery separator. Therefore, the ionic conductivity of the battery separator is effectively improved, and the cycle performance and rate performance of the battery that uses the separator are also effectively improved.

Figure 1:
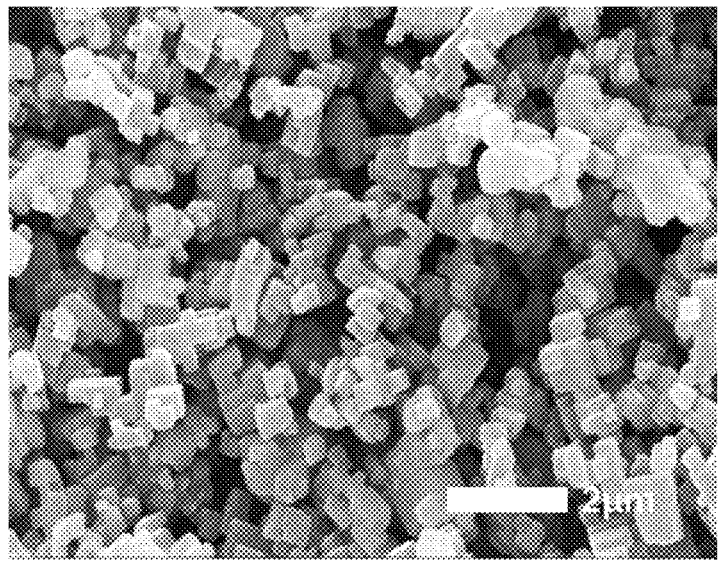
FIG. 1 is a scanning electron microscope image of an organic-inorganic hybrid porous material at a magnification of 10 k according to some embodiments of this disclosure.
Figure 2:
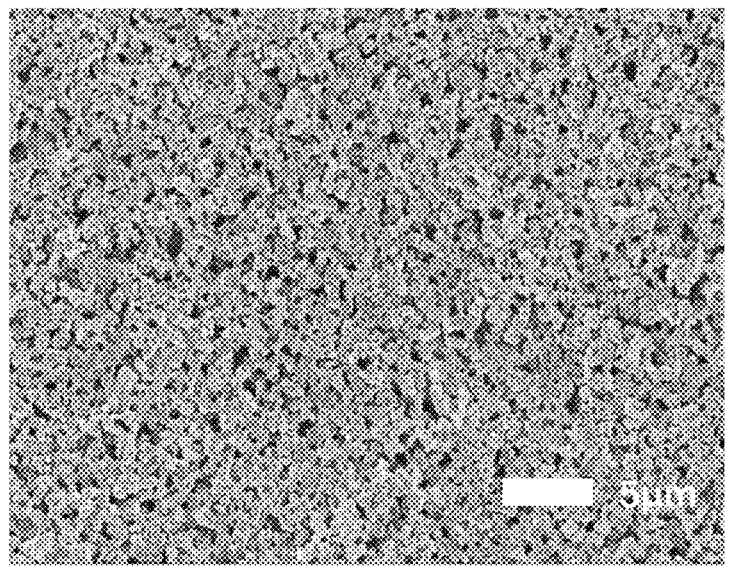
FIG. 2 is a scanning electron microscope image of an organic-inorganic hybrid porous material at a magnification of 3 k according to some embodiments of this disclosure.

REFERENCE NUMERALS 1. battery pack; 2. upper box; 3. lower box; 4. battery module; 5. secondary battery; 51. housing; 52. electrode assembly; 53. cap assembly; 31. base layer; 32. overlayer; 41. positive electrode; 42. negative electrode; d$_1$. pore diameter of the base layer; d$_2$. particle diameter of the organic-inorganic hybrid porous material

DETAILED DESCRIPTION OF EMBODIMENTS

The following describes in detail an organic-inorganic hybrid porous material and a preparation method thereof, a separator, a battery, and an electrical device according to this disclosure with due reference to drawings. However, unnecessary details may be omitted in some cases. For example, a detailed description of a well-known matter or repeated description of a substantially identical structure may be omitted. That is intended to prevent the following descriptions from becoming unnecessarily long, and to facilitate understanding by a person skilled in the art. In addition, the drawings and the following descriptions are intended for a person skilled in the art to thoroughly understand this disclosure, but not intended to limit the subject-matter set forth in the claims.

A "range" disclosed herein is defined in the form of a lower limit and an upper limit. A given range is defined by selecting a lower limit and an upper limit. The selected lower and upper limits define the boundaries of the given range. A range so defined may be inclusive or exclusive of the end values, and may be arbitrarily combined. That is, any lower limit may be combined with any upper limit to form a range. For example, if a range of 60 to 120 and a range of 80 to 110 are listed for a given parameter, it is expectable that such ranges may be understood as 60 to 110 and 80 to 120. In addition, if lower-limit values 1 and 2 are listed, and if upper-limit values 3, 4, and 5 are listed, the following ranges are all expectable: 1 to 3, 1 to 4, 1 to 5, 2 to 3, 2 to 4, and 2 to 5. Unless otherwise specified herein, a numerical range "a to b" is a brief representation of a combination of any real numbers between a and b inclusive, where both a and b are real numbers. For example, the numerical range "0 to 5" means that all real numbers between 0 and 5 inclusive are listed herein, and the range "0 to 5" is just a brief representation of combinations of such numbers. In addition, when a parameter is expressed as an integer greater than or equal to 2, the expression is equivalent to that the parameter is an integer such as 2, 3, 4, 5, 6, 7, 8, 9, 10, 11, 12, and the like.

Unless otherwise expressly specified herein, all embodiments and optional embodiments hereof may be combined with each other to form a new technical solution.

Unless otherwise expressly specified herein, all technical features and optional technical features hereof may be combined with each other to form a new technical solution.

Unless otherwise expressly specified herein, all the steps described herein may be performed sequentially or randomly, and preferably, performed sequentially. For example, that the method includes steps (a) and (b) indicates that the method may include steps (a) and (b) performed sequentially, or steps (b) and (a) performed sequentially. For example, that the method may further include step (c) indicates that step (c) may be added into the method in any order. For example, the method may include steps (a), (b), and (c), or may include steps (a), (c), and (b), or may include steps (c), (a), and (b), and so on.

Unless otherwise expressly specified herein, "include" and "comprise" mentioned herein mean open-ended inclusion, and may also mean closed-ended inclusion. For example, the terms "include" and "comprise" may mean inclusion of other items not listed, or inclusion of only the listed items.

Unless otherwise expressly specified herein, the term "or" is inclusive. For example, the phrase "A or B" means "A alone, B alone, or both A and B." More specifically, the condition "A or B" is satisfied by any of the following: A is true (or existent) and B is false (or absent); A is false (or absent) and B is true (or existent); or, both A and B are true (or existent).

In an embodiment of this disclosure, this disclosure discloses an organic-inorganic hybrid porous material. The organic-inorganic hybrid porous material contains a doping element A. The element A is one or more selected from: Li, Na, K, Rb, Cs, Sr, Zn, Mg, Ca, or any combination thereof An external specific surface area of the organic-inorganic hybrid porous material is 1 to 100 $m^2/g$. A ratio of the external specific surface area to a total specific surface area of the organic-inorganic hybrid porous material is 0.7 to 0.9.

Although the mechanism is still unclear, the applicant hereof unexpectedly finds that: when this disclosure uses the novel organic-inorganic hybrid porous material to modify a battery separator, the battery separator exhibits an improved ionic conductivity unexpectedly. A battery containing the separator exhibits improved cycle performance and rate performance unexpectedly. When an external specific surface area is greater than 100 $m^2/g$, two circumstances exist. A first circumstance is: a shape of an outer surface of the material is rather tortuous, thereby being adverse to the binding between particles and other adjuvants during coating of the separator, and being adverse to ion shuttling in a battery cell. A second circumstance is: mesopores occur massively inside the structure of an organic-inorganic hybrid compound, that is, the pore size inside the material is excessive. An inner surface area calculated based on the national GB standard actually includes an inner surface area, and is close to a total specific surface area. In this case, a metal element A inside a pore is prone to dissociate out of the hole, thereby being adverse to desolvation of the metal element A transported inside the organic-inorganic hybrid compound, reducing continuity of the transport of the metal element A inside the structure, impairing the effect of ionic conductivity enhancement, and deteriorating the battery performance. When the external specific surface area is less than 1 $m^2/g$, the binding is not enough between the particles and other adjuvants. The ions in the battery cell can transfer mass from the outside into the organic-inorganic hybrid compound. In this case, the organic-inorganic hybrid porous material can hardly provide sufficient mass transfer channels for the active metal ions dissociated between the positive electrode and the negative electrode, thereby aggravating polarization and impairing the rate performance of the battery.

In an embodiment of this disclosure, the term "organic-inorganic hybrid porous material" means a material with a one-, two- or three-dimensional porous structure formed by inorganic atoms or clusters coordinated to organic ligands.

In an embodiment of this disclosure, the "external specific surface area" and "total specific surface area" are determined by a multipoint Brunauer-Emmett-Telter (BET) method based on the multi-molecular layer adsorption theory. The total specific surface area (also known as nitrogen adsorption surface area, NSA) is a total surface area of a material calculated from nitrogen adsorption data based on the BET theory. The external specific surface area (also known as statistical thickness surface area, STSA) is an external surface area calculated from the nitrogen adsorption data based on the de Boer theory and an organic-inorganic hybrid porous material model.

In an embodiment of this disclosure, at a temperature of liquid nitrogen, the total surface area and the external surface area are calculated by using the number of nitrogen molecules adsorbed by the organic-inorganic hybrid porous material from nitrogen under a given partial pressure. The NSA and STSA can be calculated based on the adsorption parameters.

In an embodiment of this disclosure, the STSA of the material is determined by plotting a function relationship between a nitrogen volume ($V_a$) adsorbed per gram of specimen under standard temperature and pressure (STP) and an adsorption-layer statistical thickness (t). A $V_a$-t plot is drawn using $V_a$ (under STP, cm²/g) as a Y-axis (ordinate) and using $t(10^{-10}$ m) as an X-axis (abscissa). Data with a $P/P_0$ ratio value falling within a range of 0.2 to 0.5 is selected. The adsorption-layer statistical thickness is:

$$t=0.88(P/P_0)^2+6.45(P/P_0)+2.98$$

The slope of the $V_a$-t plot is determined by standard linear regression. The STSA is calculated by:

$$STSA=M\times15.47$$

In the formula above: M is the slope of the $V_a$-t plot, 15.47 is a volume conversion constant of nitrogen and liquid nitrogen, and the measurement unit is converted to m²/g.

If the $V_a$-t plot incurs a negative intercept, it is reported that the STSA value is equal to the NSA value, because the principle of this method makes it impossible for the STSA value to exceed the NSA value.

In some embodiments of this disclosure, the external specific surface area of the organic-inorganic hybrid porous material is 1 to 10 m²/g, 10 to 20 m²/g, 20 to 30 m²/g, 30 to 40 m²/g, 40 to 50 m²/g, 50 to 60 m²/g, 60 to 70 m²/g, 70 to 80 m²/g, 80 to 90 m²/g, or 90 to 100 m²/g. When a battery separator is modified by the novel organic-inorganic hybrid porous material based on the foregoing technical solution, the battery separator exhibits an improved ionic conductivity unexpectedly. A battery containing the separator exhibits improved cycle performance and rate performance unexpectedly.

In some embodiments of this disclosure, the ratio of the external specific surface area to a total specific surface area of the organic-inorganic hybrid porous material is 0.7 to 0.75, 0.75 to 0.8, 0.8 to 0.85, or 0.85 to 0.9. When a battery separator is modified by the novel organic-inorganic hybrid porous material based on the foregoing technical solution, the battery separator exhibits an improved ionic conductivity unexpectedly. A battery containing the separator exhibits improved cycle performance and rate performance unexpectedly.

In some embodiments of this disclosure, the total specific surface area of the organic-inorganic hybrid porous material is 1.15 to 140 m²/g. Optionally, the total specific surface area of the organic-inorganic hybrid porous material is 5 to 110 m²/g, 10 to 80 m²/g, 1 to 10 m²/g, 10 to 20 m²/g, 20 to 30 m²/g, 30 to 40 m²/g, 40 to 50 m²/g, 50 to 60 m²/g, 60 to 70 m²/g, 70 to 80 m²/g, 80 to 90 m²/g, 90 to 100 m²/g, or 100 to 110 m²/g. When a battery separator is modified by the novel organic-inorganic hybrid porous material based on the foregoing technical solution, the battery separator exhibits an improved ionic conductivity unexpectedly. A battery containing the separator exhibits improved cycle performance and rate performance unexpectedly.

In some embodiments of this disclosure, a volume median diameter $D_{v50}$ of the organic-inorganic hybrid porous material is 0.1 to 2 μm. Optionally, the volume median diameter $D_{v50}$ of the organic-inorganic hybrid porous material is 0.3 to 1.5 μm, 0.5 to 1.0 μm, 0.1 to 0.2 μm, 0.2 to 0.4 μm, 0.4 to 0.6 μm, 0.6 to 0.8 μm, 0.8 to 1 μm, 1.0 to 1.2 μm, 1.2 to 1.4 μm, 1.4 to 1.6 μm, 1.6 to 1.8 μm, or 1.8 to 2 μm. When a battery separator is modified by the novel organic-inorganic hybrid porous material based on the foregoing technical solution, the battery separator exhibits an improved ionic conductivity unexpectedly. A battery containing the separator exhibits improved cycle performance and rate performance unexpectedly.

In some embodiments of this disclosure, an average pore diameter of the organic-inorganic hybrid porous material is 0.1 to 10 nm. Optionally, the average pore diameter of the organic-inorganic hybrid porous material is 0.5 to 8.9 nm, 0.8 to 6.5 nm, 0.1 to 0.2 nm, 0.2 to 0.4 nm, 0.4 to 0.6 nm, 0.6 to 0.8 nm, 0.8 to 1 nm, 1 to 2 nm, 2 to 4 nm, 4 to 6 nm, 6 to 8 nm, or 8 to 10 nm. When a battery separator is modified by the novel organic-inorganic hybrid porous material based on the foregoing technical solution, the battery separator exhibits an improved ionic conductivity unexpectedly. A battery containing the separator exhibits improved cycle performance and rate performance unexpectedly.

In some embodiments of this disclosure, at least a part of the atoms or cations of the element A are distributed in the pores of the organic-inorganic hybrid porous material. The distribution positions of the A atoms can be displayed directly by using high-angle annular dark-field scanning transmission electron microscope (HAADF-STEM) atom imaging technology. When a battery separator is modified by the novel organic-inorganic hybrid porous material based on the foregoing technical solution, the battery separator exhibits an improved ionic conductivity unexpectedly. A battery containing the separator exhibits improved cycle performance and rate performance unexpectedly.

In some embodiments of this disclosure, the organic-inorganic hybrid porous material is a metal-organic framework material. When a battery separator is modified by the novel organic-inorganic hybrid porous material based on the foregoing technical solution, the battery separator exhibits an improved ionic conductivity unexpectedly. A battery containing the separator exhibits improved cycle performance and rate performance unexpectedly.

The term "metal-organic framework material" means a material with a one-, two- or three-dimensional porous structure formed by metal atoms or clusters coordinated to organic ligands.

In some embodiments of this disclosure, at least a part of atoms or cations of the element A are distributed in pores of the metal-organic framework material. When a battery separator is modified by the novel organic-inorganic hybrid porous material based on the foregoing technical solution, the battery separator exhibits an improved ionic conductivity unexpectedly. A battery containing the separator exhibits improved cycle performance and rate performance unexpectedly.

In some embodiments of this disclosure, the element A is one or more selected from: Li, Na, or K. Optionally, the element A is Li. When a battery separator is modified by the novel organic-inorganic hybrid porous material based on the foregoing technical solution, the battery separator exhibits an improved ionic conductivity unexpectedly. A battery containing the separator exhibits improved cycle performance and rate performance unexpectedly.

In some embodiments of this disclosure, a weight percent of the element A in the organic-inorganic hybrid porous material is 0.001% to 10%. Optionally, the weight percent of the element A in the organic-inorganic hybrid porous material is 0.001 to 0.01%, 0.01 to 0.1%, 0.1 to 1%, 1 to 5%, or 5 to 10%. When a battery separator is modified by the novel organic-inorganic hybrid porous material based on the foregoing technical solution, the battery separator exhibits an improved ionic conductivity unexpectedly. A battery containing the separator exhibits improved cycle performance and rate performance unexpectedly.

In some embodiments of this disclosure, the organic-inorganic hybrid porous material includes: a plurality of metal cations and/or a plurality of metal cluster cations; a plurality of bridging ligands, where the bridging ligands are linked to the metal cations and/or metal cluster cations by a coordination bond, so as to form a porously structured framework. When a battery separator is modified by the novel organic-inorganic hybrid porous material based on the foregoing technical solution, the battery separator exhibits an improved ionic conductivity unexpectedly. A battery containing the separator exhibits improved cycle performance and rate performance unexpectedly. Compared with a monodentate ligand, the bridging ligand can effectively provide a complete metal-ligand framework required for undertaking a given proportion of defective sites. The complete framework structure can more effectively improve the ionic conductivity of the separator on the basis of maintaining structural stability of the organic-inorganic hybrid compound.

The term "bridging ligand" (or bridging ligand, bridging ligand) is a ligand that links two or more atoms (usually metal atoms). The ligand itself may be a single atom, or may be formed of more than one atom.

In some embodiments of this disclosure, the organic-inorganic hybrid porous material possesses one of the following first to third structures: (i) a first structure: in the first structure, a bridging ligand is CN or SCN, a metal cation is a cation of one or more elements selected from: Zn, Co, Cu, Fe, Cd, Mn, Ag, Rh, Ru, Sc, Cr, Ni, Y, Ti, Zr, Hf, Sr, Pb, lanthanide, or any combination thereof, and the metal cation combines with the bridging ligand to form a cubic ordered assembled structure; (ii) a second structure: in the second structure, the bridging ligand is a polycarboxylic acid, the metal cation is a cation of one or more elements selected from: Zn, Co, Cu, Fe, Cd, Mn, Ag, Rh, Ru, Sc, Cr, Ni, Y, Ti, Zr, Hf, Sr, Pb, lanthanide, or any combination thereof, each metal cation is linked to four oxygen atoms on two carboxyl groups in two polycarboxylic acids by a coordination bond to form a metal-oxygen tetrahedral cluster, and the tetrahedral cluster combines with a remainder of the bridging ligand to form a cubic ordered assembled structure; and (iii) a third structure: in the third structure, the bridging ligand is optionally substituted imidazole, the metal cation is a cation of one or more elements selected from: Zn, Co, Cu, Fe, Cd, Mn, Ag, Rh, Ru, Sc, Cr, Ni, Y, Ti, Zr, Hf, Sr, Pb, lanthanide, or any combination thereof, and the metal cation combines with the bridging ligand to form a porous structure. When a battery separator is modified by the novel organic-inorganic hybrid porous material based on the foregoing technical solution, the battery separator exhibits an improved ionic conductivity unexpectedly. A battery containing the separator exhibits improved cycle performance and rate performance unexpectedly.

In some embodiments of this disclosure, the organic-inorganic hybrid porous material is expressed as a general Formula I:

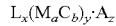

$$L_x(M_aC_b)_y \cdot A_z \qquad \text{Formula I}$$

In the general formula above, M is selected from one or more first-transition-series metal elements; a is a numerical value ranging from 0.1 to 10, x is a numerical value ranging from 0.5 to 50, y is a numerical value ranging from 0.5 to 50;

C is one or more selected from: O, CO, $O^{2-}$, $S^{2-}$, $C^-$, $Br^-$, $I^-$, $OH^-$, $H_2O$, —OH, =O, or any combination thereof, and b is a numerical value ranging from 0 to 20;

L is a bridging ligand capable of combining with a metal M or a metal cluster $M_aC_b$ to form a coordination bond; and A is one or more metal elements selected from: Li, Na, K, Rb, Cs, Sr, Zn, Mg, Ca, or any combination thereof; and, $0<z\leq100$. When a battery separator is modified by the novel organic-inorganic hybrid porous material based on the foregoing technical solution, the battery separator exhibits an improved ionic conductivity unexpectedly. A battery containing the separator exhibits improved cycle performance and rate performance unexpectedly.

In some of the foregoing technical solutions, the first-transition-series metal element is chemically active, possesses a stable low oxidation valence state (+1 to +4), a relatively high electronegativity, and a high coordination capability, and is conducive to forming a coordination bond with a typical organic ligand, or to forming a metal cluster and then forming a coordination bond with the typical organic ligand, thereby avoiding the occurrence of an element valence state as high as +5 to +7. The high valence state leads to too many coordination bonds required in the space near the metal atom. The relatively low steric hindrance effect of the first-transition-series metal element can form a stable coordination structure more easily, so as to avoid a circumstance that the second- or three-transition-series metal element forms a metal-metal bond more easily to affect the stability of the coordination bond. In this way, the ionic conductivity of the separator can be improved more effectively.

In some of the foregoing technical solutions, the metal M or metal cluster $M_aC_b$ is linked to a plurality of organic ligands L by a coordination bond. The basic units are periodically assembled along at least one spatial direction to form a three-dimensional framework structure. Pores sized 0.1 to 10 nm are formed inside the structure constructed in that way. The position of a pore can hold metal ions or atom A. During a charge-and-discharging cycle of the battery, along with the shuttling of active ions (such as lithium ions in a lithium-ion battery) at the separator, the metal ions or atoms A in the organic-inorganic hybrid compound can also participate in directional movement of the ions in an electric field. At the same time, a void is formed at the position of the pore so that the remaining active ions can move through the pore, thereby ultimately achieving the effects of enhancing the ionic conductivity of the separator and alleviating polarization.

In some embodiments of this disclosure, a is 0.1 to 0.5, 0.5 to 1, 1 to 2, 2 to 3, 3 to 4, 4 to 5, 5 to 6, 6 to 7, 7 to 8, 8 to 9, or 9 to 10.

In some embodiments of this disclosure, b is 0, 1 to 2, 2 to 3, 3 to 4, 4 to 5, 5 to 6, 6 to 7, 7 to 8, 8 to 9, 9 to 10, 10 to 11, 11 to 12, 12 to 13, 13 to 14, 14 to 15, 15 to 16, 16 to 17, 17 to 18, 18 to 19, or 19 to 20.

In some embodiments of this disclosure, x is 0.5 to 6, 3 to 5, 4 to 5, 6 to 10, 10 to 15, 15 to 20, 20 to 25, 25 to 30, 30 to 35, 35 to 40, 40 to 45, or 45 to 50.

In some embodiments of this disclosure, y is 0.5 to 2, 1 to 2, 1 to 3, 1 to 5, 5 to 10, 10 to 15, 15 to 20, 20 to 25, 25 to 30, 30 to 35, 35 to 40, 40 to 45, or 45 to 50.

In some embodiments of this disclosure, z is 1 to 5, 1 to 10, 10 to 20, 20 to 30, 30 to 40, 40 to 50, 50 to 60, 60 to 70, 70 to 80, 80 to 90, or 90 to 100.

In some embodiments of this disclosure, the organic-inorganic hybrid porous material is periodically assembled from a basic unit represented by Formula I along at least one spatial direction.

In some embodiments of this disclosure, the organic-inorganic hybrid porous material is periodically assembled from the basic unit represented by Formula I along an extension direction that is at least one of three spatial directions X', Y', and Z'. The periodically assembled quantity is an integer ranging from 3 to 10000. The three directions X', Y', and Z' are at an angle of 0 degree to 75 degrees to an X direction, a Y direction, and a Z direction of a Cartesian coordinate system respectively, and optionally, at an angle of 5 degrees to 60 degrees. When a battery separator is modified by the novel organic-inorganic hybrid porous material based on the foregoing technical solution, the battery separator exhibits an improved ionic conductivity unexpectedly. A battery containing the separator exhibits improved cycle performance and rate performance unexpectedly.

In some embodiments of this disclosure, L is one or more selected from: cyano, imidazole, porphyrin, pyridine, pyrazole, pyrimidine, piperidine, pyrrolidine, furan, thiophene, piperazine, pyridazine, indole, quinoline, carbazole, morpholine, carbazole, polycarboxylic acid, or a dimer or trimer of the foregoing ligands, or a multimer thereof. One or more hydrogen atoms in the bridging ligand are optionally substituted by one or more substituents selected from: cyano, nitro, amino, aldehyde, carboxyl, halogen, $C_1$ to $C_8$ alkyl, $C_1$ to $C_8$ hydroxyalkyl, $C_1$ to $C_8$ alkoxyl, $C_2$ to $C_8$ alkenyl, $C_2$ to $C_8$ alkynyl, $C_3$ to $C_{16}$ cycloalkyl, $C_6$ to $C_{20}$ aryl, $C_6$ to $C_{20}$ heteroaryl, or any combination thereof; and x is a numerical value ranging from 0.5 to 50. When a battery separator is modified by the novel organic-inorganic hybrid porous material based on the foregoing technical solution, the battery separator exhibits an improved ionic conductivity unexpectedly. A battery containing the separator exhibits improved cycle performance and rate performance unexpectedly.

In some embodiments of this disclosure, in Formula I, $0.5 \leq x:y \leq 6$. When a battery separator is modified by the novel organic-inorganic hybrid porous material based on the foregoing technical solution, the battery separator exhibits an improved ionic conductivity unexpectedly. A battery containing the separator exhibits improved cycle performance and rate performance unexpectedly.

In some embodiments of this disclosure, in Formula I, b>0, and $0.5 \leq a:b \leq 8$. When a battery separator is modified by the novel organic-inorganic hybrid porous material based on the foregoing technical solution, the battery separator exhibits an improved ionic conductivity unexpectedly. A battery containing the separator exhibits improved cycle performance and rate performance unexpectedly.

In some embodiments of this disclosure, in Formula I, $$1 \leq \frac{x}{ay} \leq 4.3,$$

and optionally, $$1.6 \leq \frac{x \cdot \frac{x}{a \times y}}{ay} \leq 3.$$

When a battery separator is modified by the novel organic-inorganic hybrid porous material based on the foregoing technical solution, the battery separator exhibits an improved ionic conductivity unexpectedly. A battery containing the separator exhibits improved cycle performance and rate performance unexpectedly. In the foregoing technical solution, the ratio between the ligand and the metal is moderate. In this case, the active ions can shuttle quickly in the pores of the organic-inorganic hybrid compound, the structure of the material is relatively stable, and the phase transition is controllable. In this way, the ionic conductivity is improved, and in turn, the rate performance and cycle performance are improved.

In some embodiments of this disclosure, in formula I, when M is a combination of cations of at least two metal elements, a product of a and y represents a quantity of all metal cations in a single basic unit represented by Formula I. When a battery separator is modified by the novel organic-inorganic hybrid porous material based on the foregoing technical solution, the battery separator exhibits an improved ionic conductivity unexpectedly. A battery containing the separator exhibits improved cycle performance and rate performance unexpectedly.

In some embodiments of this disclosure, L includes a cyano ligand, that is, a —CN ligand, M includes a Fe cation and/or a Ni cation, and A includes one or more elements selected from K, Na, or Li. When a battery separator is modified by the novel organic-inorganic hybrid porous material based on the foregoing technical solution, the battery separator exhibits an improved ionic conductivity unexpectedly. A battery containing the separator exhibits improved cycle performance and rate performance unexpectedly. With a low relative molecular mass (RMM) of the organic ligand, the organic-inorganic hybrid compound is highly ionically conductive, and therefore, the rate capability and cycle performance are high. The organic ligand with a low relative molecular mass constructs smaller pores for accommodating metal ions. More metal ions can be accommodated per unit space, thereby providing more ion transport channels and improving the ionic conductivity.

In some embodiments of this disclosure, L includes a benzenetricarboxylic acid ligand, that is, a BTC ligand, M includes a Fe cation, and A includes one or more elements selected from K, Na, or Li. When a battery separator is modified by the novel organic-inorganic hybrid porous material based on the foregoing technical solution, the battery separator exhibits an improved ionic conductivity unexpectedly. A battery containing the separator exhibits improved cycle performance and rate performance unexpectedly.

In some embodiments of this disclosure, L includes a citric acid ligand, that is, a CIT ligand, M includes a Cu cation, and A includes one or more elements selected from K, Na, or Li. When a battery separator is modified by the novel organic-inorganic hybrid porous material based on the foregoing technical solution, the battery separator exhibits an improved ionic conductivity unexpectedly. A battery containing the separator exhibits improved cycle performance and rate performance unexpectedly.

In some embodiments of this disclosure, L includes a tricarboxytriphenyl amine (tricarboxytriphenyl amine) ligand, that is, a TCA ligand, M includes a Cu cation, and A includes one or more elements selected from K, Na, or Li; When a battery separator is modified by the novel organic-inorganic hybrid porous material based on the foregoing technical solution, the battery separator exhibits an improved ionic conductivity unexpectedly. A battery containing the separator exhibits improved cycle performance and rate performance unexpectedly.

In some embodiments of this disclosure, L includes an anthraquinone-2,3-dicarboxylic acid ligand, that is, an AQDC ligand, M includes a Cu cation, and A includes one or more elements selected from K, Na, or Li. When a battery separator is modified by the novel organic-inorganic hybrid porous material based on the foregoing technical solution, the battery separator exhibits an improved ionic conductivity unexpectedly. A battery containing the separator exhibits improved cycle performance and rate performance unexpectedly.

In some embodiments of this disclosure, L includes an imidazole and/or 2-aminobenzimidazole ligand, that is, an Im and/or abIm ligand, M includes a Co cation, and A includes one or more elements selected from K, Na, or Li. When a battery separator is modified by the novel organic-inorganic hybrid porous material based on the foregoing technical solution, the battery separator exhibits an improved ionic conductivity unexpectedly. A battery containing the separator exhibits improved cycle performance and rate performance unexpectedly.

In some embodiments of this disclosure, L includes a terephthalic acid ligand, that is, a BDC ligand, F includes a Fe cation, C includes OH— and F—, and A includes one or more elements selected from K, Na, or Li. When a battery separator is modified by the novel organic-inorganic hybrid porous material based on the foregoing technical solution, the battery separator exhibits an improved ionic conductivity unexpectedly. A battery containing the separator exhibits improved cycle performance and rate performance unexpectedly.

In some embodiments of this disclosure, this disclosure provides a composition. The composition includes organic-inorganic hybrid porous material particles and inorganic compound particles. The organic-inorganic hybrid porous material particles are particles of any one of the organic-inorganic hybrid porous materials described above. The inorganic compound is one or more selected from: zeolite, molecular sieve, aluminum oxide, aluminum oxyhydroxide, silicon dioxide, aluminum nitride, silicon carbide, magnesium oxide, calcium oxide, zinc oxide, zirconium oxide, titanium dioxide, or any combination thereof. After the organic-inorganic hybrid porous material particles and the inorganic compound particles are blended, the two types of particles can be combined more closely due to complementarity of morphology between the particles. The organic-inorganic hybrid porous material particles can provide a high ionic conductivity, and the inorganic compound particles can provide a rigid stable separator structure. The two types of particles work synergistically to improve the rate performance and cycle performance of the battery. When a battery separator is modified by the composition based on the foregoing technical solution, the battery separator exhibits an improved ionic conductivity unexpectedly. A battery containing the separator exhibits improved cycle performance and rate performance unexpectedly.

In some embodiments of this disclosure, a weight ratio between the organic-inorganic hybrid porous material particles and the inorganic compound particles ranges from 1:5 to 5:1, for example, (1 to 2): 1. When a battery separator is modified by the composition based on the foregoing technical solution, the battery separator exhibits an improved ionic conductivity unexpectedly. A battery containing the separator exhibits improved cycle performance and rate performance unexpectedly.

In some embodiments of this disclosure, in the composition, a weight percent of the organic-inorganic hybrid porous material particles is 20 wt % to 80 wt %, for example, 60 wt % to 80 wt %. When a battery separator is modified by the composition based on the foregoing technical solution, the battery separator exhibits an improved ionic conductivity unexpectedly. A battery containing the separator exhibits improved cycle performance and rate performance unexpectedly.

In some embodiments of this disclosure, the composition further includes one or more ingredients selected from: a binder, a stabilizer, a wetting agent, a rheology modifier, a defoamer, a thickener, a pH adjuster, or an anti-corrosive agent. When a battery separator is modified by the composition based on the foregoing technical solution, the battery separator exhibits an improved ionic conductivity unexpectedly. A battery containing the separator exhibits improved cycle performance and rate performance unexpectedly.

In an embodiment of this disclosure, this disclosure discloses an electrochemical device separator, including the material described in any embodiment above or the composition described in any embodiment above.

In some embodiments of this disclosure, the electrochemical device separator includes:
a base layer; and
an overlayer, where the overlayer overlays at least a part of a surface of the base layer, and the overlayer contains the material described in any embodiment above or the composition described in any embodiment above.

In some embodiments of this disclosure, the base layer is a porous polymer layer.

In some embodiments of this disclosure, the base layer is made of a material that is one or more selected from: polyethylene, polypropylene, polyester, polyacetal, polyamide, polycarbonate, polyimide, polyether ether ketone, polyether sulfone, polyphenylene oxide, polyphenylene sulfide, polyethylene naphthalate, any polyblend thereof, or any combination thereof.

In some embodiments of this disclosure, a thickness of the base layer is 10 to 100 µm, for example, 10 to 20 µm, 10 to 20 µm, 20 to 30 µm, 30 to 40 µm, 40 to 50 µm, 50 to 60 µm, 60 to 70 µm, 70 to 80 µm, 80 to 90 µm, or 90 to 100 µm.

In some embodiments of this disclosure, a thickness of the overlayer is 0.1 to 20 µm, for example, 0.1 to 1 µm, 1 to 3 µm, 3 to 5 µm, 5 to 7 µm, 7 to 9 µm, 9 to 11 µm, 11 to 13 µm, 13 to 15 µm, 15 to 17 µm, or 17 to 20 µm.

In some embodiments of this disclosure, a volume median diameter $D_{v50}$ of the organic-inorganic hybrid porous material particles is greater than an average pore diameter of the base layer. That the particle diameter of the organic-inorganic hybrid porous material particles is greater than a pore diameter of a bare film prevents connection between a positive coating layer and a negative coating layer, and provides an appropriate transport network for free and bulk-active ions, thereby improving the transport rate of active ions, increasing the ionic conductivity, and in turn, improving the rate performance and cycle performance.

In this disclosure, the volume median diameter $D_{v50}$ of the positive active material bears the meaning well known in the art, and can be determined by the method and instrument known in the art. For example, the volume median diameter may be measured by using a laser particle size analyzer (such as Malvin Mastersizer 3000 manufactured by Britain-based Malvern Instruments Ltd.) by reference to the GB/T 19077-2016 particle size distribution laser diffraction method. $D_{v50}$ represents a particle diameter of the material measured when the cumulative volume percent of the material reaches 50% in a volume-based particle size distribution.

In an embodiment of this disclosure, this disclosure discloses the use of the material disclosed above or the composition disclosed above for improving the performance of an electrochemical device separator.

In an embodiment of this disclosure, this disclosure discloses an electrochemical device. The electrochemical device includes the separator described in any embodiment above.

In an embodiment of this disclosure, the electrochemical device is a battery. The battery includes a positive electrode, a negative electrode, and the electrochemical device separator described in any embodiment above. The separator is located between the positive electrode and the negative electrode.

In an embodiment of this disclosure, the battery further includes an electrolytic solution. The positive electrode, the negative electrode, and the separator are all in contact with the electrolytic solution.

In an embodiment of this disclosure, the positive electrode contains a positive active material. The positive active material is one or more selected from: lithium cobalt oxide, lithium nickel oxide, lithium manganese oxide, lithium nickel cobalt manganese oxide, lithium nickel cobalt aluminum oxide, lithium iron phosphate, lithium manganese iron phosphate, lithium cobalt phosphate, sulfur simple substance, or any combination thereof.

In an embodiment of this disclosure, the negative electrode is made of a material that is one or more selected from: graphite, soft carbon, hard carbon, lithium-titanium composite oxide, metal M simple substance, alloy, oxide, carbide, or any combination thereof, where the metal M is selected from Li, Si, Sn, Zn, Mg, Cd, Ce, Ni, or Fe.

In an embodiment of this disclosure, the electrolytic solution contains a lithium salt. The lithium salt is one or more selected from: LiCl, LiBr, LiI, LiClO$_4$, LiBF$_4$, LiB$_{10}$Cl$_{10}$, LiPF$_6$, LiAsF$_6$, LiSbF$_6$, LiAlCl$_4$, LiSCN, Li(FSO$_2$)$_2$N, LiCF$_3$CO$_2$, LiCH$_3$SO$_3$, LiCF$_3$SO$_3$, LiN(SO$_2$CF$_3$)$_2$, LiN(SO$_2$C$_2$F$_5$)$_2$, LiC$_4$F$_9$SO$_3$, LiC(CF$_3$SO$_2$)$_3$, (CF$_3$SO$_2$)$_2$NLi, LiOH, LiB(C$_2$O$_4$)$_2$, lithium chloroborane, lithium lower aliphatic carboxylate, lithium tetraphenylborate, lithium imide, or any combination thereof.

In an embodiment of this disclosure, the electrochemical device is a lithium-ion battery, a sodium-ion battery, a potassium-ion battery, a zinc-ion battery, a lithium-sulfur battery, or a lithium-ion supercapacitor.

In an embodiment of this disclosure, this disclosure discloses an electrical device. The electrical device includes the electrochemical device described in any embodiment above.

In an embodiment of this disclosure, this disclosure discloses a method for manufacturing an electrochemical device separator, including:
providing a base layer; and
overlaying at least a part of a surface of the base layer with an overlayer, where the overlayer contains the material described in any embodiment above or the composition described in any embodiment above.

Optionally, the base layer is a porous polymer layer.

Optionally, the base layer is made of a material that is one or more selected from: polyethylene, polypropylene, polyester, polyacetal, polyamide, polycarbonate, polyimide, polyether ether ketone, polyether sulfone, polyphenylene oxide, polyphenylene sulfide, polyethylene naphthalate, any polyblend thereof, or any combination thereof.

In an embodiment of this disclosure, the step of overlaying at least a part of a surface of the base layer with an overlayer includes the following operations:
providing a coating material, where the coating material contains the material described in any embodiment above or the composition described in any embodiment above; and
overlaying at least a part of the surface of the base layer with the coating material.

In an embodiment of this disclosure, a step of drying the base layer overlaid with the coating material is further included.

Further, an electrochemical device, a battery module, a battery pack, and an electrical device according to this disclosure are described below with due reference to the drawings.

In an embodiment of this disclosure, the electrochemical device includes a secondary battery, and may specifically be a lithium-ion battery, a sodium-ion battery, a potassium-ion battery, a zinc-ion battery, a lithium-sulfur battery, or a lithium-ion supercapacitor.

In an embodiment of this disclosure, a secondary battery is provided.

Generally, the secondary battery includes a positive electrode plate, a negative electrode plate, an electrolyte, and a separator. In a charge-and-discharge cycle of the battery, active ions are shuttled between the positive electrode plate and the negative electrode plate by intercalation and deintercalation. The electrolyte serves to conduct ions between the positive electrode plate and the negative electrode plate. Located between the positive electrode plate and the negative electrode plate, the separator mainly serves to prevent a short circuit between the positive electrode plate and the negative electrode plate, and is penetrable to ions.

[Positive Electrode Plate]

The positive electrode plate includes a positive current collector and a positive film layer that overlays at least one surface of the positive current collector. The positive film layer includes a positive active material according to the first aspect of this disclosure.

As an example, the positive current collector includes two surfaces opposite to each other in a thickness direction thereof. The positive film layer is disposed on either or both of the two opposite surfaces of the positive current collector.

In some embodiments, the positive current collector may be a metal foil or a composite current collector. For example, the metal foil may be an aluminum foil. The composite current collector may include a polymer material base layer and a metal layer formed on at least one surface of the polymer material base layer. The composite current collector may be formed by overlaying a polymer material substrate with a metal material (for example, aluminum, aluminum alloy, nickel, nickel alloy, titanium, titanium alloy, silver, and silver alloy). The polymer material substrate may be, for example, polypropylene (PP), polyethylene terephthalate (PET), polybutylene terephthalate (PBT), polystyrene (PS), or polyethylene (PE).

In some embodiments, the positive active material may be a positive active material that is well known in the art for use in a battery. For example, the positive active material may include at least one of the following materials: olivine-structured lithium-containing phosphate, lithium transition metal oxide, and a modified compound thereof. However, this disclosure is not limited to such materials, and other conventional materials usable as a positive active material of a battery may be used instead. One of the positive active materials may be used alone, or at least two thereof may be combined and used together. Examples of the lithium transition metal oxide may include, but are not limited to, at least one of lithium cobalt oxide (such as LiCoO$_2$), lithium nickel oxide (such as LiNiO$_2$), lithium manganese oxide (such as LiMnO$_2$, and LiMn$_2$O$_4$), lithium nickel cobalt oxide, lithium manganese cobalt oxide, lithium nickel manganese oxide, lithium nickel cobalt manganese oxide (such as LiNi$_{1/3}$Co$_{1/3}$Mn$_{1/3}$O$_2$ (briefly referred to as NCM$_{333}$), LiNi$_{0.5}$Co$_{0.2}$Mn$_{0.3}$O$_2$ (briefly referred to as NCM$_{523}$), LiNi$_{0.5}$Co$_{0.25}$Mn$_{0.25}$O$_2$ (briefly referred to as NCM$_{211}$), LiNi$_{0.6}$Co$_{0.2}$Mn$_{0.2}$O$_2$ (briefly referred to as NCM$_{622}$), LiNi$_{0.8}$Co$_{0.1}$Mn$_{0.1}$O$_2$ (briefly referred to as NCM$_{811}$)), lithium nickel cobalt aluminum oxide (such as $LiNi_{0.85}Co_{0.15}Al_{0.05}O_2$), or a modified compound thereof. Examples of the olivine-structured lithium-containing phosphate may include, but are not limited to, at least one of lithium iron phosphate (such as $LiFePO_4$ (briefly referred to as LFP)), a composite of lithium iron phosphate and carbon, lithium manganese phosphate (such as $LiMnPO_4$), a composite of lithium manganese phosphate and carbon, lithium manganese iron phosphate, or a composite of lithium manganese iron phosphate and carbon.

In some embodiments, the positive film layer further optionally includes a binder. For example, the binder may include at least one of polyvinylidene difluoride (PVDF), polytetrafluoroethylene (PTFE), poly(vinylidene fluoride-co-tetrafluoroethylene-co-propylene), poly (vinylidene fluoride-co-hexafluoropropylene-co-tetrafluoroethylene), poly (tetrafluoroethylene-co-hexafluoropropylene), or fluorinated acrylate resin.

In some embodiments, the positive film layer further optionally includes a conductive agent. For example, the conductive agent may include at least one of superconductive carbon, acetylene black, carbon black, Ketjen black, carbon dots, carbon nanotubes, graphene, or carbon nanofibers.

In some embodiments, the positive electrode plate may be prepared according to the following method: dispersing the ingredients of the positive electrode plate such as the positive active material, the conductive agent, and the binder and any other ingredients in a solvent (such as N-methylpyrrolidone) to form a positive slurry, coating a positive current collector with the positive slurry, and performing steps such as drying and cold pressing to obtain the positive electrode plate.

[Negative Electrode Plate]

The negative electrode plate includes a negative current collector and a negative film layer disposed on at least one surface of the negative current collector. The negative film layer includes a negative active material.

For example, the negative current collector includes two surfaces opposite to each other in a thickness direction thereof. The negative film layer is disposed on either or both of the two opposite surfaces of the negative current collector.

In some embodiments, the negative current collector may be a metal foil or a composite current collector. For example, the metal foil may be a copper foil. The composite current collector may include a polymer material base layer and a metal layer formed on at least one surface of the polymer material base layer. The composite current collector may be formed by overlaying a polymer material substrate with a metal material (for example, copper, copper alloy, nickel, nickel alloy, titanium, titanium alloy, silver, and silver alloy). The polymer material substrate may be, for example, polypropylene (PP), polyethylene terephthalate (PET), polybutylene terephthalate (PBT), polystyrene (PS), or polyethylene (PE).

In some embodiments, the negative active material may be a negative active material that is well known in the art for use in a battery. For example, the negative active material may include at least one of the following materials: artificial graphite, natural graphite, soft carbon, hard carbon, silicon-based material, tin-based material, lithium titanium oxide, and the like. The silicon-based material may be at least one selected from simple-substance silicon, silicon-oxygen compound, silicon-carbon composite, silicon-nitrogen composite, or silicon alloy. The tin-based material may be at least one selected from simple-substance tin, tin-oxygen compound, or tin alloy. However, this disclosure is not limited to such materials, and other conventional materials usable as a negative active material of a battery may be used instead. One of the negative active materials may be used alone, or at least two thereof may be combined and used together.

In some embodiments, the negative film layer further optionally includes a binder. The binder may be at least one selected from styrene-butadiene rubber (SBR), polyacrylic acid (PAA), polyacrylic acid sodium (PAAS), polyacrylamide (PAM), polyvinyl alcohol (PVA), sodium alginate (SA), polymethyl acrylic acid (PMAA), and carboxymethyl chitosan (CMCS).

In some embodiments, the negative film layer further optionally includes a conductive agent. The conductive agent may be at least one selected from superconductive carbon, acetylene black, carbon black, Ketjen black, carbon dots, carbon nanotubes, graphene, or carbon nanofibers.

In some embodiments, the negative film layer further optionally includes other agents, such as a thickener (for example, sodium carboxymethyl cellulose (CMC-Na)).

In some embodiments, the negative electrode plate may be prepared according to the following method: dispersing the ingredients of the negative electrode plate such as the negative active material, the conductive agent, and the binder and any other ingredients in a solvent (such as deionized water) to form a negative slurry, coating a negative current collector with the negative slurry, and performing steps such as drying and cold pressing to obtain the negative electrode plate.

[Electrolyte]

The electrolyte serves to conduct ions between the positive electrode plate and the negative electrode plate. The type of the electrolyte is not specifically limited in this disclosure, and may be selected as required. For example, the electrolyte may be in liquid- or gel-state, or all solid-state.

In some embodiments, the electrolyte is an electrolytic solution. The electrolytic solution includes an electrolyte salt and a solvent.

In some embodiments, the electrolyte salt may be at least one selected from lithium hexafluorophosphate, lithium tetrafluoroborate, lithium perchlorate, lithium hexafluoroarsenate, lithium bisfluorosulfonimide, lithium bistrifluoromethanesulfonimide, lithium trifluoromethanesulfonate, lithium difluorophosphate, lithium difluoro(oxalato)borate, lithium bis(oxalato)borate, lithium difluoro(bisoxalato) phosphate, or lithium tetrafluoro(oxalato)phosphate.

In some embodiments, the solvent may be at least one selected from ethylene carbonate, propylene carbonate, ethyl methyl carbonate, diethyl carbonate, dimethyl carbonate, dipropyl carbonate, methyl propyl carbonate, ethylene propyl carbonate, butylene carbonate, fluoroethylene carbonate, methyl formate, methyl acetate, ethyl acetate, propyl acetate, methyl propionate, ethyl propionate, propyl propionate, methyl butyrate, ethyl butyrate, 1,4-butyrolactone, sulfolane, methyl sulfonyl methane, ethyl methyl sulfone, and (ethylsulfonyl)ethane.

In some embodiments, the electrolytic solution further optionally includes an additive. For example, the additive may include a negative film-forming additive or a positive film-forming additive. The additive may further include additives capable of improving specified performance of the battery, for example, an additive for improving overcharge performance of the battery, an additive for improving high- or low-temperature performance of the battery, and the like.

[Separator]

In some embodiments, the secondary battery further includes a separator. The type of the base layer of the separator is not particularly limited in this disclosure, and any well-known porous structure that is highly stable both chemically and mechanically may be used as a base layer of the separator.

In some embodiments, the base layer of the separator may be made of at least one selected from glass fiber, non-woven fabric, polyethylene, polypropylene, or polyvinylidene difluoride. The separator may be a single-layer film or a multilayer composite film, without being particularly limited. When the separator is a multilayer composite film, materials of different layers may be identical or different, without being particularly limited.

In some embodiments, the positive electrode plate, the negative electrode plate, and the separator may be wound or stacked to form an electrode assembly.

In some embodiments, the secondary battery may include an outer package. The outer package may be configured to package the electrode assembly and the electrolyte.

In some embodiments, the outer package of the secondary battery may be a hard shell such as a hard plastic shell, an aluminum shell, a steel shell, or the like. Alternatively, the outer package of the secondary battery may be a soft package such as a pouch-type soft package. The material of the soft package may be plastic such as polypropylene, polybutylene terephthalate, or polybutylene succinate.

Figure 5:
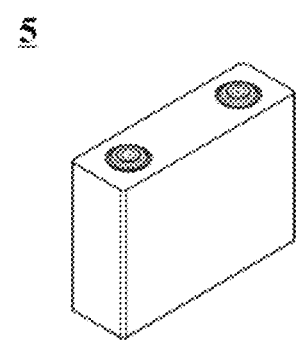
FIG. 5 is a schematic diagram of a secondary battery according to an embodiment of this disclosure.

The shape of the secondary battery is not particularly limited in this disclosure, and may be cylindrical, prismatic or any other shape. FIG. 5 shows a prismatic secondary battery 5 as an example.

Figure 6:
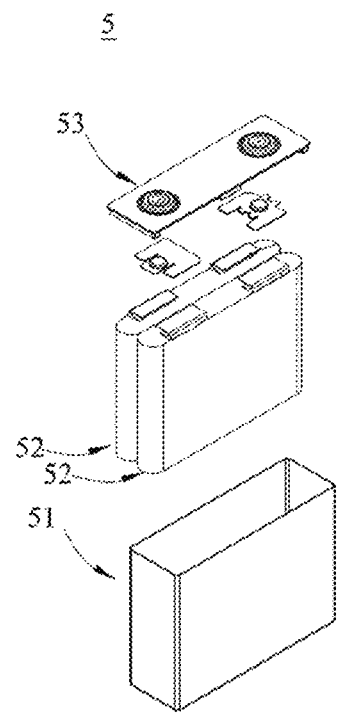
FIG. 6 is an exploded view of a secondary battery shown in FIG. 5 according to an embodiment of this disclosure.

In some embodiments, referring to FIG. 6, the outer package may include a housing body 51 and a cover plate 53. The housing body 51 may include a bottom plate and a side plate connected to the bottom plate. The bottom plate and the side plate close in to form an accommodation cavity. The housing body 51 is provided with an opening that communicates with the accommodation cavity. The cover plate 53 can cover the opening to close the accommodation cavity. The positive electrode plate, the negative electrode plate, and the separator may be wound or stacked to form the electrode assembly 52. The electrode assembly 52 is packaged in the accommodation cavity. The electrolytic solution serves a function of infiltration in the electrode assembly 52. The number of electrode assemblies 52 in a secondary battery 5 may be one or more, and may be selected by a person skilled in the art as actually required.

In some embodiments, the secondary battery may be assembled into a battery module. The battery module may include one or more secondary batteries, and the specific number of secondary batteries in a battery module may be selected by a person skilled in the art depending on the disclosure scenario and capacity of the battery module.

Figure 7:
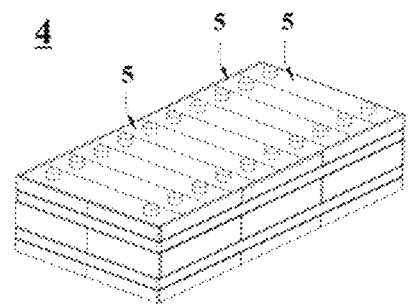
FIG. 7 is a schematic diagram of a battery module according to an embodiment of this disclosure.

FIG. 7 shows a battery module 4 as an example. Referring to FIG. 7, in the battery module 4, a plurality of secondary batteries 5 may be arranged sequentially along a length direction of the battery module 4. Alternatively, the secondary batteries may be arranged in any other manner. Further, the plurality of secondary batteries 5 may be fixed by a fastener.

Optionally, the battery module 4 may further include a shell that provides an accommodation space. The plurality of secondary batteries 5 are accommodated in the accommodation space.

In some embodiments, the battery modules may be assembled into a battery pack. The battery pack may include one or more battery modules, and the specific number of battery modules in a battery pack may be selected by a person skilled in the art depending on practical disclosures and capacity of the battery pack.

Figure 8:
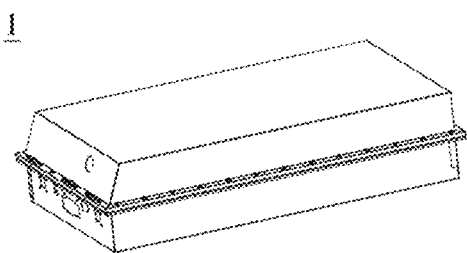
FIG. 8 is a schematic diagram of a battery pack according to an embodiment of this disclosure.
Figure 9:
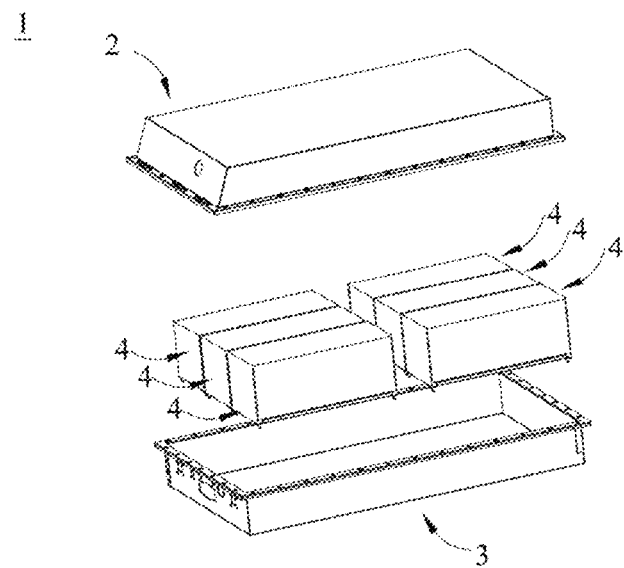
FIG. 9 is an exploded view of the battery pack shown in FIG. 8 according to an embodiment of this disclosure.

FIG. 8 and FIG. 9 show a battery pack 1 as an example. Referring to FIG. 8 and FIG. 9, the battery pack 1 may contain a battery box and a plurality of battery modules 4 disposed in the battery box. The battery box includes an upper box 2 and a lower box 3. The upper box 2 fits the lower box 3 to form a closed space for accommodating the battery modules 4. The plurality of battery modules 4 may be arranged in the battery box in any manner.

Further, this disclosure provides an electrical device. The electrical device includes at least one of the secondary battery, the battery module, or the battery pack according to this disclosure. The secondary battery, the battery module, or the battery pack may be used as a power supply of the electrical device, or used as an energy storage unit of the electrical device. The electrical device may include, but without being limited to, a mobile device (such as a mobile phone or a laptop computer), an electric vehicle (such as a battery electric vehicle, a hybrid electric vehicle, a plug-in hybrid electric vehicle, an electric bicycle, an electric scooter, an electric golf cart, or an electric truck), an electric train, a ship, a satellite system, or an energy storage system.

The secondary battery, the battery module, or the battery pack may be selected for the electrical device according to practical requirements of the electrical device.

Figure 10:
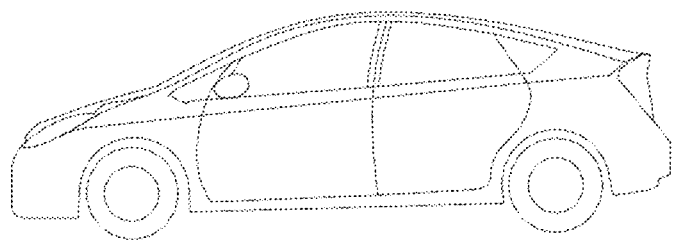
FIG. 10 is a schematic diagram of an electrical device that uses a secondary battery as a power supply according to an embodiment of this disclosure.

FIG. 10 shows an electrical device as an example. The electrical device may be a battery electric vehicle, a hybrid electric vehicle, a plug-in hybrid electric vehicle, or the like. To meet the requirements of the electrical device on a high power and a high energy density of the secondary battery, a battery pack or a battery module may be employed.

In another example, the electrical device may be a mobile phone, a tablet computer, a notebook computer, or the like. The apparatus is generally required to be thin and light, and may have a secondary battery as a power supply.

EMBODIMENTS

The following describes embodiments of this disclosure. The embodiments described below are exemplary, and are merely intended to construe this disclosure but not to limit this disclosure. In a case that no specific technique or condition is specified in an embodiment, the techniques or conditions described in the literature in this field or described in the instruction manual of the product may apply. A reagent or instrument used herein without specifying the manufacturer is a conventional product that is commercially available in the market.

I. Ingredients

The ingredients used in embodiments and comparative embodiments are shown in the following table:

TABLE 1

| Chemical formula of ingredient | CAS number/source |
| --- | --- |
| $NiCl_2$ | 7718-54-9 |
| $Li_4Fe(CN)_6$ | 13601-18-8 |
| $K_4Fe(CN)_6$ | 13943-58-3 |
| $Na_4Fe(CN)_6$ | 13601-19-9 |
| HIm | 288-32-4 |
| HabIm | 934-32-7 |
| $H_3BTC$ | 554-95-0 |
| $H_3CIT$ | 77-92-9 |
| $H_2AQDC$ | 27485-15-0 |
| $H_2BDC$ | 100-21-0 |
| PP-PE copolymer microporous film | ZhuoGao Electronic Technology Co., Ltd. |

TABLE 1-continued

| Chemical formula of ingredient | CAS number/source |
| --- | --- |
| Polymethyl acrylate | Hubei NORNA Co., Ltd. |
| Poly(acrylic acid-co-acrylate-co-acrylonitrile) | Hubei NORNA Co., Ltd. |
| Polyoxyethylene ether | Hubei NORNA Co., Ltd. |

Embodiment 1

1. Preparing an Organic-Inorganic Hybrid Porous Material

Dissolving 129 grams of a first ingredient ($NiCl_2$) in deionized water to obtain a first feed solution (a solution containing 0.1 mol/L $NiCl_2$). Dissolving 192 grams of a second ingredient ($Li_4Fe(CN)_6$) in deionized water to obtain a second feed solution (a solution containing 0.08 mol/L $Li_4Fe(CN)_6$). Heating up the first and second feed solutions to 80° C. Adding the first feed solution into the second feed solution dropwise at a speed of 1 mL/min. Stirring the second feed solution with a propellent stirring paddle at a speed of 400 r/min during the dropwise addition. Passing oxygen gas continuously into the second feed solution during the dropwise addition. Upon completion of the dropwise addition, storing the resulting product at 80° C. for 24 hours for a purpose of aging, and keeping stirring during the aging to obtain a precipitated product. Collecting the precipitated product by leaching. Treating the precipitated product in a vacuum atmosphere at 150° C. for 10 hours. The resulting product is an organic-inorganic hybrid porous material expressed as the following general formula I.

$$L_x(M_aC_b)_y \cdot A_z \quad \text{Formula I}$$

In the general formula above, M is selected from one or more first-transition-series metal elements; a is a numerical value ranging from 0.1 to 10, x is a numerical value ranging from 0.5 to 50, y is a numerical value ranging from 0.5 to 50.

C is one or more selected from: O, CO, $O^{2-}$, $S^{2-}$, $C^-$, $Br^-$, $I^-$, $OH^-$, $H_2O$, —OH, =O, or any combination thereof, and b is a numerical value ranging from 0 to 20.

L is a bridging ligand capable of combining with a metal M or a metal cluster $M_aC_b$ to form a coordination bond.

A is one or more metal elements selected from: Li, Na, K, Rb, Cs, Sr, Zn, Mg, Ca, or any combination thereof; and z is a value ranging from 0 to 100, and z is greater than 0.

In this embodiment, the organic-inorganic hybrid porous material is $(CN)_{4.8}NiFe_{0.8} \cdot Li_{1.2}$. This material is used for preparing a separator in a next step.

FIG. 1 is a scanning electron microscope image of an organic-inorganic hybrid porous material according to Embodiment 1, where (a) is an image zoomed at a magnification of 10 k, and (b) is an image zoomed at a magnification of 3 k. As can be seen from the drawing, the particles possess a cubic packing morphology. The surface of the particles is smooth without macropores. The particles overlap each other to form pores and provide dense electron transport channels, so that energy storage particles can be transported between the pores or inside the particles.

2. Preparing a Separator

Figure 3:
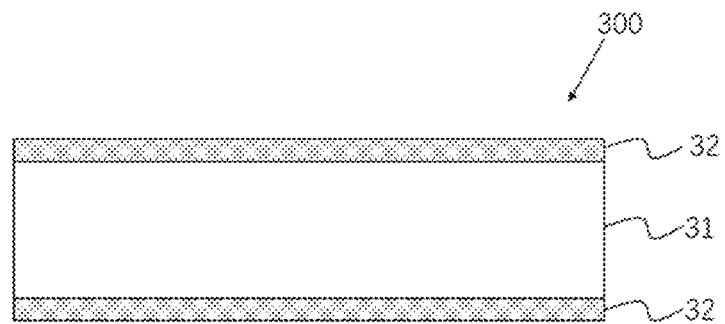
FIG. 3 is a schematic diagram of a separator according to an embodiment of this disclosure.

FIG. 3 is a schematic diagram of an electrochemical device separator according to an embodiment. The electrochemical device separator 300 includes a base layer 31 and an overlayer 32. The overlayer 32 overlays both surfaces of the base layer 31. The overlayer 32 contains the organic-inorganic hybrid porous material.

In this embodiment, a PP-PE copolymer microporous film with a thickness of 20 μm and with an average pore diameter of 80 nm is provided as the base layer. Using the material in the previous step as a functional ingredient, mixing the functional ingredient with polymethyl acrylate as a binder, a poly(acrylic acid-co-acrylate-co-acrylonitrile) as another binder, sodium carboxymethyl cellulose (chemically pure) as a stabilizer, and polyoxyethylene ether as a wetting agent evenly at a weight ratio of 85:6:3:3:3, and adding water to prepare a slurry with a solid content of 9 wt %. Coating both surfaces of the base layer with the slurry by scraping, so as to form a wet coating layer 30 μm thick. Drying the coated product at 80° C. for 60 minutes to obtain a separator product. A dry coating layer on each side of the separator product is 5 μm thick.

3. Preparing a Secondary Battery

Figure 4:
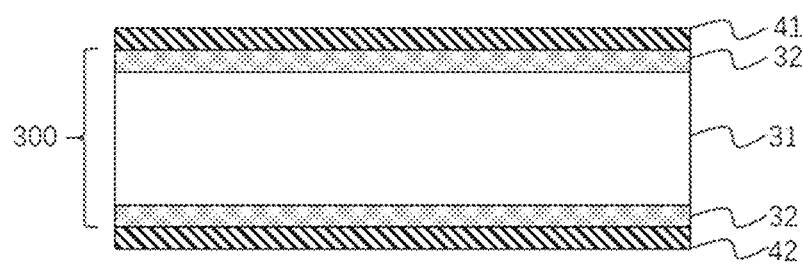
FIG. 4 is a schematic diagram of a separator according to an embodiment of this disclosure.

Preparing a Secondary Battery:

FIG. 4 is a schematic diagram of a battery according to an embodiment. The battery includes a positive electrode 41, a negative electrode 42, and an electrochemical device separator 300. The electrochemical device separator 300 is located between the positive electrode 41 and the negative electrode 42. The electrochemical device separator 300 includes a base layer 31 and an overlayer 32. The overlayer 32 overlays both surfaces of the base layer 31. The overlayer 32 contains the organic-inorganic hybrid porous material.

In this embodiment, the preparation steps are as follows: Stirring and mixing well $LiNi_{0.6}Co_{0.2}Mn_{0.2}O_2$ as a positive active material, acetylene black (Denka, Denka Black) as a conductive agent, and polyvinylidene difluoride (Arkema, HSV 900) as a binder in an N-methylpyrrolidone solvent at a weight ratio of 94:3:3 to obtain a slurry with a solid content of 30 wt %. Forming a wet coating 250 μm thick on one side of a 12-μm-thick aluminum foil by transfer coating. Subsequently, transferring the aluminum foil into an oven, and drying at 150° C. for 60 minutes. Cold-pressing the foil at a pressure of 60 tons by using a calendering machine, so as to obtain a positive electrode plate. A dry coating layer on the surface of the positive electrode plate is 130 μm thick.

Stirring and mixing well graphite as a negative active material, acetylene black as a conductive agent, styrene butadiene rubber as a binder, and sodium carboxymethyl cellulose as a thickener at a weight ratio of 95:2:2:1 in a deionized water solvent system to obtain a slurry with a solid content of 35 wt %. Spreading the slurry onto one side of a 12-μm-thick copper foil by using a doctor blade, so as to form a wet coating layer 120 μm thick. Subsequently, transferring the aluminum foil into an oven, and drying at 150° C. for 60 minutes. Cold-pressing the foil at a pressure of 50 tons by using a calendering machine, so as to obtain a negative electrode plate. A dry coating layer on the surface of the negative electrode plate is 60 μm thick.

Stacking and winding the positive electrode plate, the separator prepared in the previous step, and the negative electrode plate in sequence to form a jelly-roll stacked structure (16 cm×10 cm×2.8 cm in size), that is, a bare cell. Putting the bare cell into a steel shell, injecting 150 grams of electrolytic solution into the steel shell, and packaging the steel shell to obtain a secondary battery. The electrolytic solution is a solution containing 1 mol/L $LiPF_6$, and the solvent is a product of mixing EC, DEC, and DMC at a volume ratio of 1:1:1.

Embodiments 2 to 22

1. Preparing an Organic-Inorganic Hybrid Porous Material

The preparation method of the organic-inorganic hybrid porous material in Embodiments 2 to 22 is distinguished from Embodiment 1 by one or more of the following parameters (see Table 2 for details):
  (1) Ingredients of the first feed solution and the concentration of each ingredient;
  (2) Ingredients of the second feed solution and the concentration of each ingredient;
  (3) Stirring speed; and
  (4) Storing temperature.

2. The preparation method of the separator is identical to that in Embodiment 1.

3. The preparation method of the secondary battery is identical to that in Embodiment 1.

Embodiments 23 to 27

A powdery composition, which is used for preparing a separator in a next step, is provided. The powdery composition includes an organic-inorganic hybrid porous material $(CN)_{4.8}NiFe_{0.8} \cdot Li_{1.2}$ prepared according to Embodiment 1 and $Al_2O_3$ powder. The volume median diameter $D_v50$ of the $Al_2O_3$ material is 0.5 μm, and the external surface area of the material is 2.3 g/m³. The formula of the composition is as follows:

| Ingredients | Embodiment | | | | |
| --- | --- | --- | --- | --- | --- |
| | 23 | 24 | 25 | 26 | 27 |
| $(CN)_{4.8}NiFe_{0.8} \cdot Li_{1.2}$ | 80 wt % | 60 wt % | 51 wt % | 40 wt % | 20 wt % |
| $Al_2O_3$ | 20 wt % | 40 wt % | 49 wt % | 60 wt % | 80 wt % |

The preparation method of the separator is identical to that in Embodiment 1.

The preparation method of the secondary battery is identical to that in Embodiment 1.

Comparative Embodiment 1

The separator is a PP-PE copolymer microporous film with a thickness of 20 μm and with an average pore diameter of 80 nm. The separator is not coated, but is directly used for assembling the secondary battery.

The preparation method of the secondary battery is identical to that in Embodiment 1.

Comparative Embodiment 2

A $Li_3PO_4$ material (powder) with a volume median diameter $D_{v50}$ of 0.5 μm and an external surface area of 8.5 g/m³ is provided, and used for preparing a separator in a next step.

The preparation method of the separator is identical to that in Embodiment 1. The preparation method of the secondary battery is identical to that in Embodiment 1.

Comparative Embodiment 3

An $Al_2O_3$ material (powder) with a volume median diameter $D_{v50}$ of 0.5 μm and an external surface area of 2.3 g/m³ is provided, and used for preparing a separator in a next step.

The preparation method of the separator is identical to that in Embodiment 1. The preparation method of the secondary battery is identical to that in Embodiment 1.

Comparative Embodiments 4 to 9

1. Preparing an Organic-Inorganic Hybrid Porous Material

The preparation method of the organic-inorganic hybrid porous material in Comparative Embodiments 4 to 9 is distinguished from Embodiment 1 by one or more of the following parameters (see Table 2 for details):
  (1) Ingredients of the first feed solution and the concentration of each ingredient;
  (2) Ingredients of the second feed solution and the concentration of each ingredient;
  (3) Stirring speed; and
  (4) Storing temperature.

2. The preparation method of the separator is identical to that in Embodiment 1.

3. The preparation method of the secondary battery is identical to that in Embodiment 1.

Table 2 shows the first feed solution parameters, the second feed solution parameters, the stirring speed, the storing temperature, and the chemical formula of the resulting product involved in the method for preparing the organic-inorganic hybrid porous materials in Embodiments 1 to 22 and Comparative Embodiments 4 to 9.

TABLE 2

| | First feed solution<br>Solution ingredients and weight<br>Solution ingredients and concentration<br>(M = mol/L) | Second feed solution<br>Solution ingredients and weight<br>Solution ingredients and concentration<br>(M = mol/L) | Stirring speed (r/min) | Storing temperature ° C. | Chemical formula of product |
| --- | --- | --- | --- | --- | --- |
| Embodiment 1 | $NiCl_2$ (129 g)<br>0.1M $NiCl_2$ | $Li_4Fe(CN)_6$ (192 g)<br>0.08M $Li_4Fe(CN)6$ | 400 | 80 | $(CN)_{4.8}NiFe_{0.8} \cdot Li_{1.2}$ |
| Embodiment 2 | $Cu(NO_3)_2$ (281 g) + $NaNO_3$ (43 g)<br>0.15M $Cu(NO_3)_2$ + 0.05M $NaNO_3$ | $H_3BTC$ (210 g)<br>0.1M $H_3$ BTC | 400 | 80 | $BTC_2Cu_3 \cdot Na$ |
| Embodiment 3 | $Co(NO_3)_2$ (183 g) + $LiNO_3$ (69 g)<br>0.1M $Co(NO_3)_2$ +0.1M $LiNO_3$ | HIM (123 g) + HabIM (62 g)<br>0.15M HIM + 0.05M HabIM | 400 | 80 | $(IM)_{1.5}(abIM)_{0.5}Co \cdot Li$ |
| Embodiment 4 | $Fe(NO_3)_2$ (180 g) + $LiNO_3$ (69 g)<br>0.1M $Fe(NO_3)_2$ + 0.1M $LiNO_3$ | $H_3BTC$ (210 g)<br>0.1M $H_3$ BTC | 800 | 80 | $(BTC)Fe \cdot Li$ |
| Embodiment 5 | $CuNO_3$ (126 g) + $LiNO_3$ (35 g)<br>0.1M $CuNO_3$ + 0.05M $LiNO_3$ | $H_3CIT$ (96 g)<br>0.05M $H_3CIT$ | 200 | 80 | $(CIT) Cu_2 \cdot Li$ |
| Embodiment 6 | $Cu(NO_3)_2$ (188 g) + $LiNO_3$ (35 g)<br>0.1M $Cu(NO_3)_2$ + 0.05M $LiNO_3$ | $H_3TCA$ (377 g)<br>0.1M $H_3TCA$ | 400 | 80 | $(TCA)Cu \cdot Li_{0.5}$ |
| Embodiment 7 | $Mn(NO_3)_2$ (179 g) + $KNO_3$ (40 g)<br>0.1M $Mn(NO_3)_2$ + 0.04M $KNO_3$ | $H_2AQDC$ (296 g)<br>0.1M $H_2AQDC$ | 400 | 80 | $(2,7\text{-}AQDC)Mn \cdot K_{0.4}$ |

TABLE 2-continued

| | First feed solution<br>Solution ingredients and weight<br>Solution ingredients and concentration<br>(M = mol/L) | Second feed solution<br>Solution ingredients and weight<br>Solution ingredients and concentration<br>(M = mol/L) | Stirring speed (r/min) | Storing temperature °C. | Chemical formula of product |
|---|---|---|---|---|---|
| Embodiment 8 | $Fe(OH)_2$ (90 g) + HF (4 g) + $LiNO_3$ (41 g)<br>0.1M $Fe(OH)_2$ + 0.02M HF + 0.06M $LiNO_3$ | $H_2BDC$ (133 g)<br>0.08M $H_2BDC$ | 400 | 80 | $BDC_{0.8}[Fe(OH)_{0.8}F_{0.2}]\cdot Li_{0.6}$ |
| Embodiment 9 | $Fe(OH)_2$ (90 g) + HF (4 g) + $LiNO_3$ (69 g)<br>0.1M $Fe(OH)_2$ + 0.02M HF + 0.1M $LiNO_3$ | $H_2BDC$ (166 g)<br>0.1M $H_2BDC$ | 400 | 80 | $BDC[Fe(OH)_{0.8}F_{0.2}]\cdot Li$ |
| Embodiment 10 | $Fe(OH)_2$ (65 g) + HF (2.9 g) + $LiNO_3$ (66 g)<br>0.072M $Fe(OH)_2$ + 0.0144M HF + 0.096M $LiNO_3$ | $H_2BDC$ (200 g)<br>0.12M $H_2BDC$ | 400 | 80 | $BDC_3[Fe(OH)_{0.8}F_{0.2}]_{1.8}\cdot Li_{2.4}$ |
| Embodiment 11 | $Fe(OH)_2$ (36 g) + HF (1.6 g) + $LiNO_3$ (83 g)<br>0.04M $Fe(OH)_2$ + 0.008M HF + 0.12M $LiNO_3$ | $H_2BDC$ (200 g)<br>0.12M $H_2BDC$ | 400 | 80 | $BDC_3[Fe(OH)_{0.8}F_{0.2}]\cdot Li_3$ |
| Embodiment 12 | $Fe(OH)_2$ (29 g) + HF (1.3 g) + $LiNO_3$ (99 g)<br>0.032M $Fe(OH)_2$ + 0.0064M HF + 0.144M $LiNO_3$ | $H_2BDC$ (200 g)<br>0.12M $H_2BDC$ | 400 | 80 | $BDC_3[Fe(OH)_{0.8}F_{0.2}]_{0.8}\cdot Li_{3.6}$ |
| Embodiment 13 | $Fe(OH)_2$ (25 g) + HF (1.1 g) + $LiNO_3$ (108 g) 0.028M $Fe(OH)_2$ + 0.0056M HF + 0.156M $LiNO_3$ | $H_2BDC$ (200 g)<br>0.12M $H_2BDC$ | 400 | 80 | $BDC_3[Fe(OH)_{0.8}F_{0.2}]_{0.7}\cdot Li_{3.9}$ |
| Embodiment 14 | $NiCl_2$ (129 g)<br>0.1M $NiCl_2$ | $Li_4Fe(CN)_6$ (240 g)<br>0.1M $Li_4Fe(CN)_6$ | 450 | 80 | $(CN)_6NiFe\cdot Li_2$ |
| Embodiment 15 | $NiCl_2$ (129 g)<br>0.1M $NiCl_2$ | $Li_4Fe(CN)_6$ (192 g)<br>0.1M $Li_4Fe(CN)_6$ | 400 | 30 | $(CN)_{4.8}NiFe_{0.8}\cdot Li_{1.2}$ |
| Embodiment 16 | $NiCl_2$ (129 g)<br>0.1M $NiCl_2$ | $Li_4Fe(CN)_6$ (192 g)<br>0.1M $Li_4Fe(CN)_6$ | 400 | 90 | $(CN)_{4.8}NiFe_{0.8}\cdot Li_{1.2}$ |
| Embodiment 17 | $NiCl_2$ (129 g)<br>0.1M $NiCl_2$ | $Li_4Fe(CN)_6$ (192 g)<br>0.1M $Li_4Fe(CN)_6$ | 200 | 80 | $(CN)_{4.8}NiFe_{0.8}\cdot Li_{1.2}$ |
| Embodiment 18 | $NiCl_2$ (129 g)<br>0.1M $NiCl_2$ | $Li_4Fe(CN)_6$ (192 g)<br>0.1M $Li_4Fe(CN)_6$ | 1200 | 80 | $(CN)_{4.8}NiFe_{0.8}\cdot Li_{1.2}$ |
| Embodiment 19 | $NiCl_2$ (129 g)<br>0.1M $NiCl_2$ | $Na_4Fe(CN)_6$ (243 g)<br>0.08M $Na_4Fe(CN)_6$ | 400 | 80 | $(CN)_{4.8}NiFe_{0.8}\cdot Na_{1.2}$ |
| Embodiment 20 | $NiCl_2$ (129 g)<br>0.1M $NiCl_2$ | $K_4Fe(CN)6$ (294 g)<br>0.08M $K_4Fe(CN)_6$ | 400 | 80 | $(CN)_{4.8}NiFe_{0.8}\cdot K_{1.2}$ |
| Embodiment 21 | $MnCl2$ (126 g)<br>0.1M MnCl2 | $Li_4Fe(CN)_6$ (192 g)<br>0.1M $Li_4Fe(CN)_6$ | 400 | 80 | $(CN)_{4.8}MnFe_{0.8}\cdot Li_{1.2}$ |
| Embodiment 22 | $NiCl_2$ (129 g)<br>0.1M $NiCl_2$ | $Li_4Fe(CN)_6$ (43.2 g)<br>0.018M $Li_4Fe(CN)_6$ | 400 | 80 | $(CN)_{1.08}NiFe_{0.18}\cdot Li_{1.2}$ |
| Comparative Embodiment 4 | $NiCl_2$ (129 g)<br>0.1M $NiCl_2$ | $Li_4Fe(CN)_6$ (192 g)<br>0.08M $Li_4Fe(CN)_6$ | 1 | 80 | $(CN)_{4.8}NiFe_{0.8}\cdot Li_{1.2}$ |
| Comparative Embodiment 5 | $NiCl_2$ (129 g)<br>0.1M $NiCl_2$ | $Li_4Fe(CN)_6$ (192 g)<br>0.08M $Li_4Fe(CN)_6$ | 2000 | 80 | $(CN)_{4.8}NiFe_{0.8}\cdot Li_{1.2}$ |
| Comparative Embodiment 6 | $NiCl_2$ (129 g)<br>0.1M $NiCl_2$ | $li_4Fe(CN)_6$ (192 g)<br>0.08M $Li_4Fe(CN)_6$ | 400 | 5 | $(CN)_{4.8}NiFe_{0.8}\cdot Li_{1.2}$ |
| Comparative Embodiment 7 | $NiCl_2$ (129 g)<br>0.1M $NiCl_2$ | $Li_4Fe(CN)_6$ (192 g)<br>0.08M $Li_4Fe(CN)_6$ | 400 | 100 | $(CN)_{4.8}NiFe_{0.8}\cdot Li_{1.2}$ |
| Comparative Embodiment 8 | $NiCl_2$ (97 g)<br>0.075M $NiCl_2$ | $Li_4Fe(CN)_6$ (144 g)<br>0.06M $Li_4Fe(CN)_6$ | 400 | 100 | $(CN)_{4.8}NiFe_{0.8}\cdot Li_{1.2}$ |
| Comparative Embodiment 9 | $NiCl_2$ (177 g)<br>0.1375M $NiCl_2$ | $Li_4Fe(CN)_6$ (264 g)<br>0.11M $Li_4Fe(CN)_6$ | 400 | 100 | $(CN)_{4.8}NiFe_{0.8}\cdot Li_{1.2}$ |

III. Analysis and Test Items

The organic-inorganic hybrid porous materials, the separators, and the batteries prepared in the embodiments and comparative embodiments are tested, and the test results are shown in Table 3. Examples of main test methods are as follows:

For the test method of the external specific surface area of the material, refer to GB/T 10722-2003 Carbon Black—Determination of Total and External Surface Areas by Nitrogen Adsorption. As defined in this standard, the external surface area is a statistical thickness surface area (Statistical Thickness Surface Area, STSA).

For the test method of the total specific surface area of the material, refer to GB/T 10722-2003, in which nitrogen gas is used as an adsorption and desorption gas.

The pore diameter of the material is tested in the following way: refer to GB/T 21650.2-2008 to measure volumes of mesopores and macropores of the material, and then refer to GB/T 21650.3-2011 to measure a volume of micropores of the material. The average pore diameter is: total pore volume/specific surface area×4. This test method assumes that the pores of the material are simple columnar pores.

The doping element A in the material is tested in the following way: Drying a specimen of the material in a 150° C. vacuum environment to remove the adsorbed water impurities. Subsequently, performing an inductively coupled plasma-optical emission spectrometry (ICP) test (SPECTRO BLUE, from SPECTRO Analytical Instruments GmbH) on the specimen to determine a fraction of the doping element A.

The ionic conductivity of the separator is tested by performing a constant-voltage AC impedance spectroscopy test on separator specimens that include different layers, where the test is performed based on a space-limited symmetric cell method by using a Biologic VMP3 electrochemical workstation. Specifically, the mode in the EC-Lab software is set to Impedance Spectroscopy, and the parameters are set to the following values: frequency range: 1 MHz to 1 kHz; amplitude Va: 5 mV; E Range: −1 V to 1 V; and sampling frequency: Nd=10 and Na=3. A symmetrical single-layer stacked battery is prepared in the following way: cutting out wafers from symmetrical copper foils, each with an area of 154 mm$^2$; using the two wafers as two sides of a multilayer separator respectively; and using a 1 mol/L LiPF$_6$ PC solution as an electrolytic solution. The battery is tested at a normal temperature of 25° C. Rendered in a Nyquist plot, the test results take on a straight line, in which an intersection with the X-axis is Rs. The measured Rs values of the separators that include different numbers of layers are used to make a plot, in which a slope of a straight line fitted from the values is K. Therefore, the ionic conductivity l of the separator is calculated by l=K/K$_0$×l$_0$, where l$_0$ is the ionic conductivity of an known type specimen, and K$_0$ is the slope of the straight line fitted from values of the known type specimen measured by the same method.

The volume median diameter D$_{v50}$ is tested by using a Malvern Mastersizer 3000. The particle type is non-spherical and a dispersing medium is deionized water.

The rate performance of the secondary battery is measured in the following way: Putting a secondary battery into a test channel of an Arbin electrochemical workstation. Charging the battery at a constant current of 0.1 C rate until a charge cut-off voltage of 4 V, and then charging the battery at a constant voltage for 30 minutes. Subsequently, discharging the battery at a constant current of a 0.1 C rate and a 1 C rate separately until a discharge cut-off voltage of 2.5 V, recording the discharge capacities corresponding to the two discharge rates as a 0.1 C capacity and a 1 C capacity respectively, and calculating the rate performance: rate performance=(1 C capacity/0.1 C capacity)×100%.

The cycle performance of the secondary battery is measured in the following way: Putting a secondary battery into a test channel of an Arbin electrochemical workstation. Charging the battery at a constant current of 1 C rate until a charge cut-off voltage of 4 V, leaving the battery to stand for 5 minutes, and then discharging the battery at a constant current of a 1 C rate until a discharge cut-off voltage of 2.5 V, recording the discharge capacities, and then leaving the battery to stand for 5 minutes. Repeating the foregoing charge-and-discharge process for 500 cycles, and calculating the cycle performance: cycle performance=500$^{th}$-cycle capacity/1$^{st}$-cycle capacity×100%.

TABLE 3

| | Separator coating layer ingredients and performance | | | | | | Separator performance | Performance of secondary battery | |
|---|---|---|---|---|---|---|---|---|---|
| | Main ingredients of separator coating layer | D$_{v50}$ (μm) | External specific surface area (STSA) m$^2$/g | Total specific surface area (NSA) (m$^2$/g) | STSA/ NSA (%) | Average pore diameter of porous material (nm) | Ionic conductivity (10$^{-3}$ S/cm) | Rate performance (%) | Cycle performance (%) |
| Comparative Embodiment 1 | No coating on the separator | — | — | — | — | — | 0.9 | 85 | 63 |
| Comparative Embodiment 2 | Li$_3$PO$_4$ | 0.5 | 8.51 | 8.86 | 96% | | 1.3 | 83 | 75 |
| Comparative Embodiment 3 | Al$_2$O$_3$ | 0.5 | 2.30 | 2.30 | ~100% | — | 0.8 | 82 | 83 |
| Comparative Embodiment 4 | (CN)$_{4.8}$NiFe$_{0.8}$Li$_{1.2}$ | 0.5 | 0.50 | 0.61 | 82% | 5.5 | 0.7 | 79 | 80 |
| Comparative Embodiment 5 | (CN)$_{4.8}$NiFe$_{0.8}$Li$_{1.2}$ | 0.5 | 120 | 146 | 82% | 5.5 | 0.5 | 75 | 79 |
| Comparative Embodiment 6 | (CN)$_{4.8}$NiFe$_{0.8}$Li$_{1.2}$ | 0.02 | 8.51 | 9.56 | 89% | 5.5 | 2.3 | 72 | 79 |
| Comparative Embodiment 7 | (CN)$_{4.8}$NiFe$_{0.8}$Li$_{1.2}$ | 3 | 8.51 | 11.66 | 73% | 5.5 | 0.7 | 76 | 74 |
| Comparative Embodiment 8 | (CN)$_{4.8}$NiFe$_{0.8}$Li$_{1.2}$ | 3 | 8.51 | 9.35 | 91% | 5.5 | 1.5 | 79 | 74 |
| Comparative Embodiment 9 | (CN)$_{4.8}$NiFe$_{0.8}$Li$_{1.2}$ | 3 | 8.51 | 12.33 | 69% | 5.5 | 1.3 | 75 | 82 |
| Embodiment 1 | (CN)$_{4.8}$NiFe$_{0.8}$Li$_{1.2}$ | 0.5 | 8.51 | 10.38 | 82% | 5.5 | 2.0 | 95 | 92 |
| Embodiment 2 | BTC$_2$Cu$_3$Na | 0.7 | 64.3 | 80.4 | 80% | 0.5 | 1.3 | 86 | 89 |
| Embodiment 3 | (Im)$_{1.5}$(abIM)$_{0.5}$CoLi | 0.3 | 80.1 | 109.7 | 73% | 1.2 | 1.2 | 89 | 87 |
| Embodiment 4 | (BTC)FeLi | 0.5 | 57.9 | 70.6 | 82% | 8.9 | 1.3 | 87 | 88 |
| Embodiment 5 | (CIT)Cu$_2$Li | 1 | 4.28 | 5.71 | 75% | 6.2 | 1.7 | 90 | 86 |
| Embodiment 6 | (TCA)CuLi$_{0.5}$ | 0.5 | 8.50 | 11.6 | 73% | 5.0 | 1.4 | 86 | 84 |
| Embodiment 7 | (2,7-AQDC)MnK$_{0.4}$ | 0.5 | 14.1 | 19.6 | 72% | 4.9 | 1.4 | 86 | 85 |
| Embodiment 8 | BDC$_{0.8}$[Fe(OH)$_{0.8}$F$_{0.2}$]Li$_{0.6}$ | 0.5 | 15.4 | 19.3 | 80% | 0.1 | 1.4 | 87 | 86 |
| Embodiment 9 | BDC[Fe(OH)$_{0.8}$F$_{0.2}$]Li | 0.5 | 15.4 | 18.8 | 82% | 0.8 | 1.7 | 89 | 88 |
| Embodiment 10 | BDC$_3$[Fe(OH)$_{0.8}$F$_{0.2}$]$_{1.8}$Li$_{2.4}$ | 0.5 | 15.4 | 18.1 | 85% | 1.5 | 2.0 | 92 | 90 |
| Embodiment 11 | BDC$_3$[Fe(OH)$_{0.8}$F$_{0.2}$]Li$_3$ | 0.5 | 15.4 | 17.7 | 87% | 1.7 | 2.1 | 91 | 91 |
| Embodiment 12 | BDC$_3$[Fe(OH)$_{0.8}$F$_{0.2}$]$_{0.8}$Li$_{3.6}$ | 0.5 | 15.4 | 17.5 | 88% | 1.8 | 1.6 | 89 | 88 |
| Embodiment 13 | BDC$_3$[Fe(OH)$_{0.8}$F$_{0.2}$]$_{0.7}$Li$_{3.9}$ | 0.5 | 15.4 | 17.3 | 89% | 1.8 | 1.4 | 87 | 86 |
| Embodiment 14 | (CN)$_6$NiFeLi$_2$ | 0.5 | 9.01 | 10.5 | 86% | 7.0 | 1.8 | 93 | 94 |
| Embodiment 15 | (CN)$_{4.8}$NiFe$_{0.8}$•Li$_{1.2}$ | 0.1 | 8.51 | 10.3 | 83% | 6.2 | 1.1 | 87 | 86 |
| Embodiment 16 | (CN)$_{4.8}$NiFe$_{0.8}$Li$_{1.2}$ | 2 | 8.51 | 11.2 | 76% | 4.6 | 1.3 | 91 | 87 |
| Embodiment 17 | (CN)$_{4.8}$NiFe$_{0.8}$Li$_{1.2}$ | 0.5 | 4.21 | 5.13 | 82% | 5.7 | 1.2 | 90 | 87 |
| Embodiment 18 | (CN)$_{4.8}$NiFe$_{0.8}$Li$_{1.2}$ | 0.5 | 90.1 | 110 | 82% | 5.4 | 1.0 | 90 | 87 |
| Embodiment 19 | (CN)$_{4.8}$NiFe$_{0.8}$Na$_{1.2}$ | 0.5 | 8.51 | 10.4 | 82% | 5.6 | 1.8 | 91 | 89 |
| Embodiment 20 | (CN)$_{4.8}$NiFe$_{0.8}$K$_{1.2}$ | 0.5 | 8.51 | 10.4 | 82% | 5.8 | 1.5 | 88 | 86 |
| Embodiment 21 | (CN)$_{4.8}$MnFe$_{0.8}$Li$_{1.2}$ | 0.5 | 8.51 | 11.1 | 77% | 6.5 | 2.0 | 95 | 92 |
| Embodiment 22 | (CN)$_{1.08}$NiFe$_{0.18}$Li$_{1.2}$ | 0.5 | 8.51 | 10.0 | 85% | 9.8 | 1.5 | 86 | 87 |
| Embodiment 23 | 80%(CN)$_{4.8}$NiFe$_{0.8}$Li$_{1.2}$+ 20% Al$_2$O$_3$ | 0.5 | 8.51 | — | 82% | — | 1.9 | 95 | 93 |
| Embodiment 24 | 60%(CN)$_{4.8}$NiFe$_{0.8}$Li$_{1.2}$+ 40% Al$_2$O$_3$ | 0.5 | 8.51 | — | 82% | — | 1.9 | 96 | 94 |

TABLE 3-continued

| | Separator coating layer ingredients and performance | | | | | Separator performance | | Performance of secondary battery | |
| --- | --- | --- | --- | --- | --- | --- | --- | --- | --- |
| | Main ingredients of separator coating layer | $D_{v50}$ (μm) | External specific surface area (STSA) m²/g | Total specific surface area (NSA) (m²/g) | STSA/ NSA (%) | Average pore diameter of porous material (nm) | Ionic conductivity ($10^{-3}$ S/cm) | Rate performance (%) | Cycle performance (%) |
| Embodiment 25 | 51%$(CN)_{4.8}NiFe_{0.8}Li_{1.2}{}^{+}$ 49% $Al_2O_3$ | 0.5 | 8.51 | — | 82% | — | 1.7 | 92 | 89 |
| Embodiment 26 | 40%$(CN)_{4.8}NiFe_{0.8}Li_{1.2}{}^{+}$ 60% $Al_2O_3$ | 0.5 | 8.51 | — | 82% | — | 1.4 | 90 | 88 |
| Embodiment 27 | 20%$(CN)_{4.8}NiFe_{0.8}Li_{1.2}{}^{+}$ 80% $Al_2O_3$ | 0.5 | 8.51 | — | 82% | — | 1.1 | 87 | 84 |

*Note:
For embodiments 23 to 27, the external specific surface area (STSA) and the STSA/NSA (%) are indicators that are measured for $(CN)_{4.8}NiFe_{0.8}Li_{1.2}$ alone, without counting $Al_2O_3$ in.

The experimental data in Table 3 leads to the following experimental conclusions:

1. About the External Specific Surface Area of the Organic-Inorganic Hybrid Porous Material In Embodiments 1 to 27, the external specific surface area of the organic-inorganic hybrid porous material is 1 to 100 m²/g, the organic-inorganic hybrid porous material is used as a coating material for the separator, the separator exhibits an improved ionic conductivity unexpectedly, and the secondary battery exhibits improved cycle performance and rate performance.

The separator in Comparative Embodiment 1 lacks the coating layer, the separator in Comparative Embodiment 2 is coated with a material containing $Li_3PO_4$, and the separator in Comparative Embodiment 3 is coated with a material containing $Al_2O_3$. The ionic conductivity of the separators in Comparative Embodiments 1 to 3 and/or the cycle performance and rate performance of the secondary battery are inferior to those in Embodiments 1 to 27.

In Comparative Embodiment 4, the external specific surface area of the organic-inorganic hybrid porous material is 0.5 m²/g (less than 1 m²/g), the organic-inorganic hybrid porous material is used as a coating material for the separator, the ionic conductivity of the separator is relatively low, and the cycle performance and rate performance of the secondary battery are inferior to those in Embodiments 1 to 27. Without being significantly affected by theories, when the organic-inorganic hybrid porous material in Comparative Embodiment 4 is used as a coating material for the separator, the binding is not enough between the material and other adjuvants. In this case, the organic-inorganic hybrid porous material can hardly provide sufficient mass transfer channels for the active metal ions dissociated between the positive electrode and the negative electrode, thereby aggravating polarization and impairing the rate performance of the battery.

In Comparative Embodiment 5, the particle diameter of the organic-inorganic hybrid porous material is 120 m²/g (greater than 100 m²/g), the organic-inorganic hybrid porous material is used as a coating material for the separator, the ionic conductivity of the separator is relatively low, and the cycle performance and rate performance of the secondary battery are inferior to those in Embodiments 1 to 27. Without being limited by theories, the shape of the outer surface of the organic-inorganic hybrid porous material in Comparative Embodiment 5 may be rather tortuous, thereby being adverse to the binding between the particles and other adjuvants during coating of the separator, and being adverse to ion shuttling between positive electrode and the negative electrode. In addition, the internal pore diameter of the organic-inorganic hybrid porous material in Comparative Embodiment 5 may be rather large. The doping element A inside the pores is prone to dissociate, thereby being adverse to desolvation of the element A transported in the organic-inorganic hybrid porous material. Consequently, the continuity of the transport of the metal element A in the structure is reduced, the effect of enhancing the ionic conductivity is impaired, and the battery performance is deteriorated.

2. About the Particle Diameter of the Organic-Inorganic Hybrid Porous Material

In Embodiments 1 to 27, the volume median diameter $D_{v50}$ of the organic-inorganic hybrid porous material is 0.1 to 2 μm. When the organic-inorganic hybrid porous material is used as a coating material for the separator, the particle diameter of the organic-inorganic hybrid porous material is greater than a pore diameter of the base layer. On the one hand, this prevents connection between a positive coating layer and a negative coating layer, and, on the other hand, this provides an appropriate transport network for free and bulk-active ions, thereby improving the transport rate of active ions, increasing the ionic conductivity, and in turn, improving the rate performance and cycle performance. The separator exhibits an improved ionic conductivity unexpectedly, and the secondary battery exhibits improved cycle performance and rate performance.

In Embodiment 6, the volume median diameter $D_{v50}$ of the organic-inorganic hybrid porous material is 0.02 μm (less than 0.1 μm). The organic-inorganic hybrid porous material is used as a coating material for the separator, the separator exhibits an improved ionic conductivity, and the cycle performance and rate performance of the secondary battery are superior to that in Comparative Embodiment 1, but inferior to that in Embodiment 1.

In Comparative Embodiments 7 to 9, the volume median diameter $D_{v50}$ of the organic-inorganic hybrid porous material is 3 μm (greater than 2 μm). The separator exhibits an improved ionic conductivity, and the cycle performance and rate performance of the secondary battery are superior to that in Comparative Embodiment 1, but inferior to that in Embodiment 1.

3. About the Relative Molecular Mass of the Bridging Ligand in the Organic-Inorganic Hybrid Porous Material As can be seen from Comparing Embodiment 1 and Embodiment 6, the relative molecular mass of the bridging ligand in Embodiment 1 is smaller, the ionic conductivity of the organic-inorganic hybrid compound is higher, and the rate performance and cycle performance are higher. That is because the organic ligand with a low relative molecular mass constructs smaller pores for accommodating metal ions. More metal ions can be accommodated per unit space, thereby providing more ion transport channels and improving the ionic conductivity.

4. About the General Formula of the Organic-Inorganic Hybrid Porous Material $L_x(M_aC_b)_y \cdot A_z$ As can be seen from comparison between Embodiments 1, 8 to 13, and 22, when $1 \leq x:(a \times y) \leq 4.3$, especially when $1.6 \leq x:(a \times y) \leq 3$, the ratio between the bridging ligand and the metal is moderate. In this case, the active ions can shuttle quickly in the pores of the organic-inorganic hybrid compound, the structure of the material is relatively stable, and the phase transition is controllable. Therefore, the ionic conductivity of the separator is further improved, and the rate performance and cycle performance of the secondary battery are further improved.

5. About the Mixture of the Organic-Inorganic Hybrid Porous Material and $Al_2O_3$ As can be seen from Embodiments 1 and 23 to 27, after the organic-inorganic hybrid porous material particles and the $Al_2O_3$ particles are blended, the two types of particles can be bound more closely due to complementarity of morphology between the particles. The metallic organic hybrid compound provides a high ionic conductivity, and the $Al_2O_3$ provides a rigid stable separator structure. The two types of particles work synergistically to improve the rate performance and cycle performance of the battery. When the content of the organic-inorganic hybrid porous material is 60% to 80%, the performance of the separator and secondary battery is unexpectedly improved.

The foregoing experimental phenomena and the rules summarized according to the experimental phenomena are all discovered for the first time by this disclosure, and are not expected by a person skilled in the art before this disclosure. The achieved technical effects of the organic-inorganic hybrid porous material, the separator, and the battery cell prepared in the embodiments are all discovered for the first time by this disclosure, and are not expected by a person skilled in the art before this disclosure.

To sum up, the organic-inorganic hybrid porous material according to this disclosure achieves one or more of the following beneficial effects:

(1) The organic-inorganic hybrid porous material is used as an overlayer material for the separator, and the separator exhibits an improved ionic conductivity;

(2) The battery containing the separator exhibits an improved cycle performance; and (3) The battery containing the separator exhibits an improved rate performance.

It is hereby noted that this disclosure is not limited to the foregoing embodiments. The foregoing embodiments are merely examples. Any and all embodiments with substantively the same composition or exerting the same effects as the technical ideas hereof without departing from the scope of the technical solutions of this disclosure still fall within the technical scope of this disclosure. In addition, all kinds of variations of the embodiments conceivable by a person skilled in the art and any other embodiments derived by combining some constituents of the embodiments hereof without departing from the subject-matter of this disclosure still fall within the scope of this disclosure.

What is claimed is:

1. An organic-inorganic hybrid porous material comprising
a doping element A, a bridging ligand, and a metal cation, wherein the doping element A comprises Li, the bridging ligand comprises CN, the metal cation comprises at least one of Ni and Fe, or a combination thereof;
an external specific surface area of the organic-inorganic hybrid porous material is 1 to 100 m²/g; and
a ratio of the external specific surface area to a total specific surface area of the organic-inorganic hybrid porous material is 0.7 to 0.9.

2. The organic-inorganic hybrid porous material according to claim 1, wherein the total specific surface area of the organic-inorganic hybrid porous material is 1.15 to 140 m²/g.

3. The organic-inorganic hybrid porous material according to claim 1, wherein a volume median diameter $D_{v50}$ of the organic-inorganic hybrid porous material is 0.1 to 2 μm.

4. The organic-inorganic hybrid porous material according to claim 1, wherein an average pore diameter of the organic-inorganic hybrid porous material is 0.1 to 10 nm.

5. The organic-inorganic hybrid porous material according to claim 1, wherein at least a part of atoms or cations of the element A are distributed in pores of the organic-inorganic hybrid porous material.

6. The organic-inorganic hybrid porous material according to claim 1, wherein the organic-inorganic hybrid porous material is a metal-organic framework material.

7. The organic-inorganic hybrid porous material according to claim 1, wherein:
a weight percent of the doping element A in the organic-inorganic hybrid porous material is 0.001% to 10%.

8. The organic-inorganic hybrid porous material according to claim 1, wherein the organic-inorganic hybrid porous material comprises:
a plurality of metal cations including the metal cation;
a plurality of bridging ligands including the bridging ligand, wherein the bridging ligands are linked to the metal cations by a coordination bond to form a porously structured framework.

9. The organic-inorganic hybrid porous material according to claim 1, wherein the metal cation combines with the bridging ligand to form a cubic ordered assembled structure.

10. The organic-inorganic hybrid porous material according to claim 1, wherein the organic-inorganic hybrid porous material is expressed as a general Formula I:

$$L_x(M_aC_b)_y \cdot A_z \qquad \text{Formula I}$$

wherein, M represents the metal cation;
wherein, C is one or more selected from: O, CO, $O^{2-}$, $S^{2-}$, $C^-$, $Br^-$, $I^-$, $OH^-$, $H_2O$, —OH, =O, or any combination thereof;
wherein, $M_aC_b$ represents a metal cluster formed by M and C;
wherein, L represents the bridging ligand and combines with the metal cluster $M_aC_b$ to form a coordination bond; and
a is a numerical value ranging from 0.1 to 10, b is a numerical value ranging from 0 to 20, x is a numerical value ranging from 0.5 to 50, y is a numerical value ranging from 0.5 to 50, and $0 < z \leq 100$.

11. The organic-inorganic hybrid porous material according to claim 10, wherein the organic-inorganic hybrid porous material is periodically assembled from a basic unit represented by Formula I along at least one spatial direction.

12. The organic-inorganic hybrid porous material according to claim 10, wherein:
in Formula I, 0.5≤x:y≤6;
in Formula I, b>0, and 0.5≤a:b≤8;
in Formula I, $$1 \leq \frac{x}{ay} \leq 4.3;$$

or
in formula I, when M is a combination of cations of at least two metal elements, a product of a and y represents a quantity of all metal cations in a single basic unit represented by Formula I.

13. An electrochemical device separator, comprising the organic-inorganic hybrid porous material according to claim 1.

14. The electrochemical device separator according to claim 13, comprising:
a base layer, wherein
the base layer is a porous polymer layer; and
the base layer is made of a material that is one or more selected from: polyethylene, polypropylene, polyester, polyacetal, polyamide, polycarbonate, polyimide, polyether ether ketone, polyether sulfone, polyphenylene oxide, polyphenylene sulfide, polyethylene naphthalate, any polyblend thereof, or any combination thereof.

15. The electrochemical device separator according to claim 14, wherein a volume median diameter $D_{v50}$ of the organic-inorganic hybrid porous material particles is greater than an average pore diameter of the base layer.

16. The electrochemical device separator according to claim 13, wherein the organic-inorganic hybrid porous material is applied for use of improving performance of the electrochemical device separator.

17. An electrochemical device, wherein the electrochemical device comprises the electrochemical device separator according to claim 14.

18. An electrical device, wherein the electrical device comprises the electrochemical device according to claim 17.

* * * * *